(12) United States Patent
Fletcher et al.

(10) Patent No.: US 11,337,358 B2
(45) Date of Patent: May 24, 2022

(54) TECHNIQUES FOR AUTOMATED PLANTING

(71) Applicants: Biocarbon Engineering Ltd., Oxford (GB); Lauren E. Fletcher, Reno, NV (US); Matthew S. Ritchie, Oxford (GB); Susan M. Graham, Oxford (GB)

(72) Inventors: Lauren E. Fletcher, Reno, NV (US); Matthew S. Ritchie, Oxford (GB); Susan M. Graham, Oxford (GB); Shuning Bian, Oxford (GB)

(73) Assignee: DENDRA SYSTEMS LTD., Oxford (GB)

(*) Notice: Subject to any disclaimer, the term of this patent is extended or adjusted under 35 U.S.C. 154(b) by 19 days.

(21) Appl. No.: 15/513,126

(22) PCT Filed: Sep. 23, 2015

(86) PCT No.: PCT/US2015/051768
§ 371 (c)(1),
(2) Date: Mar. 21, 2017

(87) PCT Pub. No.: WO2016/049217
PCT Pub. Date: Mar. 31, 2016

(65) Prior Publication Data
US 2019/0116719 A1 Apr. 25, 2019

Related U.S. Application Data

(60) Provisional application No. 62/209,227, filed on Aug. 24, 2015, provisional application No. 62/054,280, filed on Sep. 23, 2014.

(51) Int. Cl.
*A01C 21/00* (2006.01)
*A01B 79/00* (2006.01)
(Continued)

(52) U.S. Cl.
CPC .......... *A01B 79/005* (2013.01); *A01C 21/005* (2013.01); *A01G 9/0293* (2018.02);
(Continued)

(58) Field of Classification Search
None
See application file for complete search history.

(56) References Cited

U.S. PATENT DOCUMENTS 5,040,471 A 8/1991 Lamont
6,070,539 A 6/2000 Flamme
(Continued)

FOREIGN PATENT DOCUMENTS

JP 2001251906 9/2001
JP 2011254711 12/2011
(Continued)

OTHER PUBLICATIONS

Office Action received in JP Application No. 2017-516950 dated Apr. 3, 2018.
(Continued)

*Primary Examiner* — Truc M Do
(74) *Attorney, Agent, or Firm* — Womble Bond Dickinson (US) LLP

(57) ABSTRACT

Embodiments of the present invention provide techniques, including systems and methods, for planting using planting pods. A planting system can be configured to deliver pods including a payload (e.g., seeds, cuttings, or other planting materials) into or onto the ground at a predetermined location. In some embodiments, the automated planting system can include a mapping system that receives various sensor inputs and generates a map of a planting area. A pod planting system may use the map of the planting area to deliver pods to the planting area. The pod planting system may be executed automatically using the maps generated by the
(Continued)

mapping system and/or manually by a remote operator. Each pod can include a payload to be planted on or in the ground by the pod planting system. Pods may be customized depending on the types of plants being planted, the terrain, prior planting results, etc.

19 Claims, 30 Drawing Sheets

(51) Int. Cl.
- *A01G 9/029* (2018.01)
- *B64D 1/08* (2006.01)
- *B64C 39/02* (2006.01)
- *B64D 1/16* (2006.01)

(52) U.S. Cl.
CPC .............. *B64C 39/024* (2013.01); *B64D 1/08* (2013.01); *B64D 1/16* (2013.01); *B64C 2201/027* (2013.01); *B64C 2201/12* (2013.01); *B64C 2201/128* (2013.01); *B64C 2201/141* (2013.01)

(56) References Cited

U.S. PATENT DOCUMENTS

| | | | |
|---|---|---|---|
| 6,671,582 B1 | 12/2003 | Hanley | |
| 7,779,770 B2 | 8/2010 | Sauder | |
| 9,382,003 B2* | 7/2016 | Burema | ............... A01B 79/005 |
| 9,471,064 B1* | 10/2016 | Boland | ................... G05D 1/104 |
| 9,745,060 B2* | 8/2017 | O'Connor | ............. B64C 39/024 |
| 9,852,644 B2* | 12/2017 | Salnikov | ................. A01B 79/02 |
| 10,139,279 B2* | 11/2018 | Pluvinage | ............. G01J 3/2823 |
| 2006/0213167 A1 | 9/2006 | Koselka et al. | |
| 2010/0070072 A1 | 3/2010 | Goldman | |
| 2013/0068892 A1 | 3/2013 | Bin Desa et al. | |
| 2014/0035752 A1 | 2/2014 | Johnson | |
| 2014/0165890 A1 | 6/2014 | Graham | |
| 2014/0303814 A1* | 10/2014 | Burema | ............... A01B 79/005 |
| | | | 701/3 |
| 2015/0237790 A1* | 8/2015 | Redden | ................... G01C 11/06 |
| | | | 701/50 |

FOREIGN PATENT DOCUMENTS

| | | |
|---|---|---|
| JP | 2014103932 | 6/2014 |
| WO | 2004107841 | 12/2004 |
| WO | 2014026183 | 2/2014 |

OTHER PUBLICATIONS

Office Action received in CA Application No. 2,962,076 dated Apr. 4, 2018.
Office Action received in AU Application No. 2015320681 dated Apr. 30, 2018.
Extended European Search Report issued in Application No. 15844818.3 dated May 18, 2018.
First Examination Report issued in corresponding New Zealand Application No. 731232, dated Nov. 20, 2017.

* cited by examiner

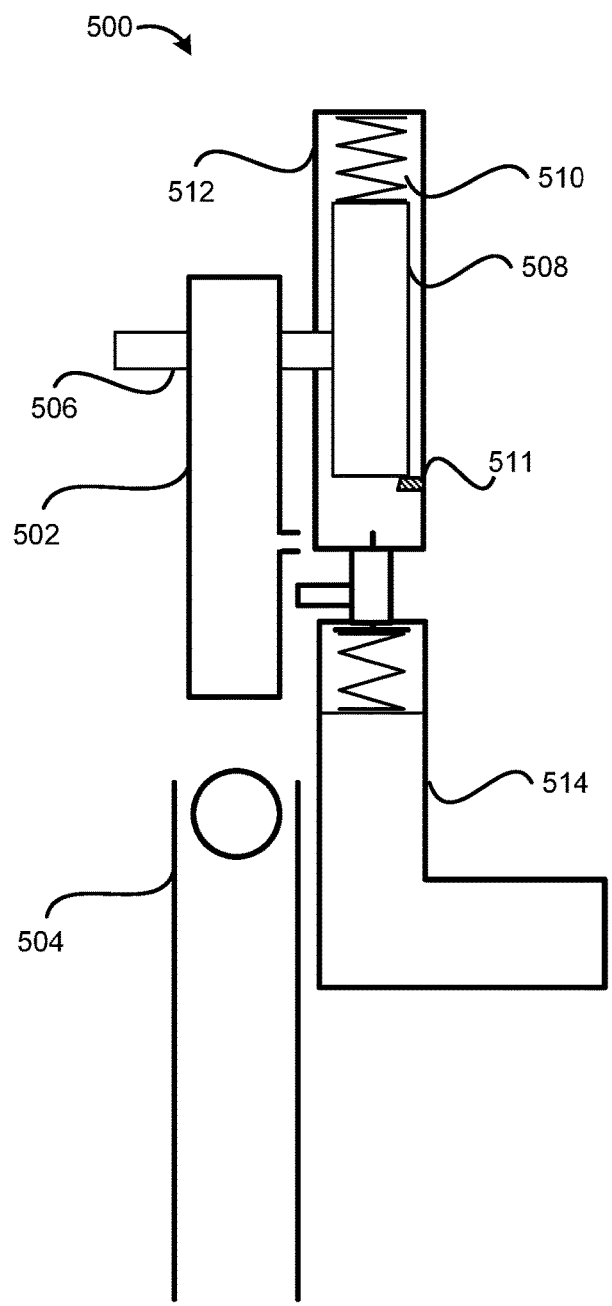 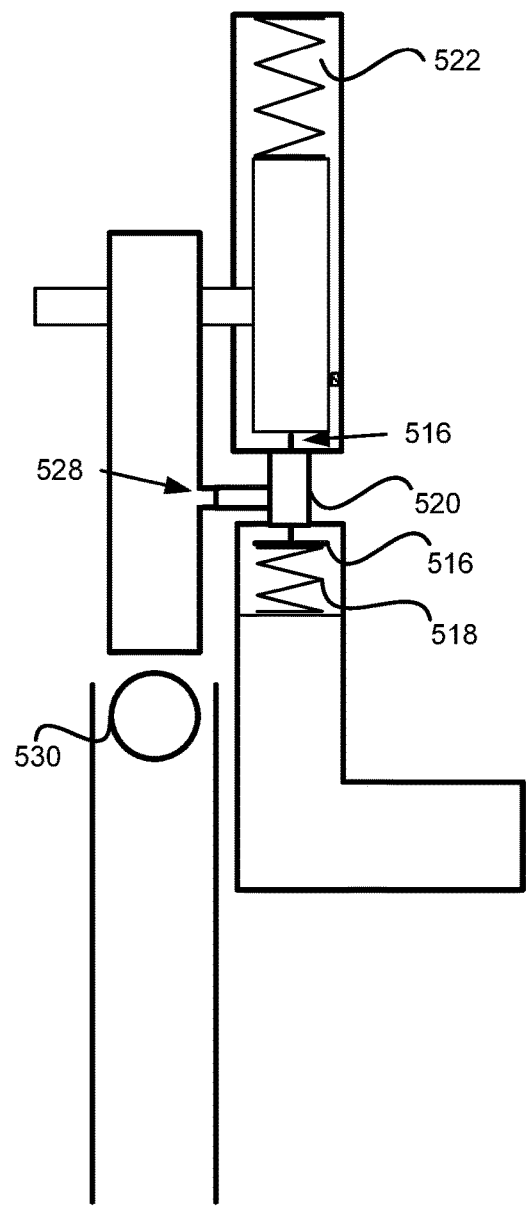
*FIG. 5A*      *FIG. 5B*

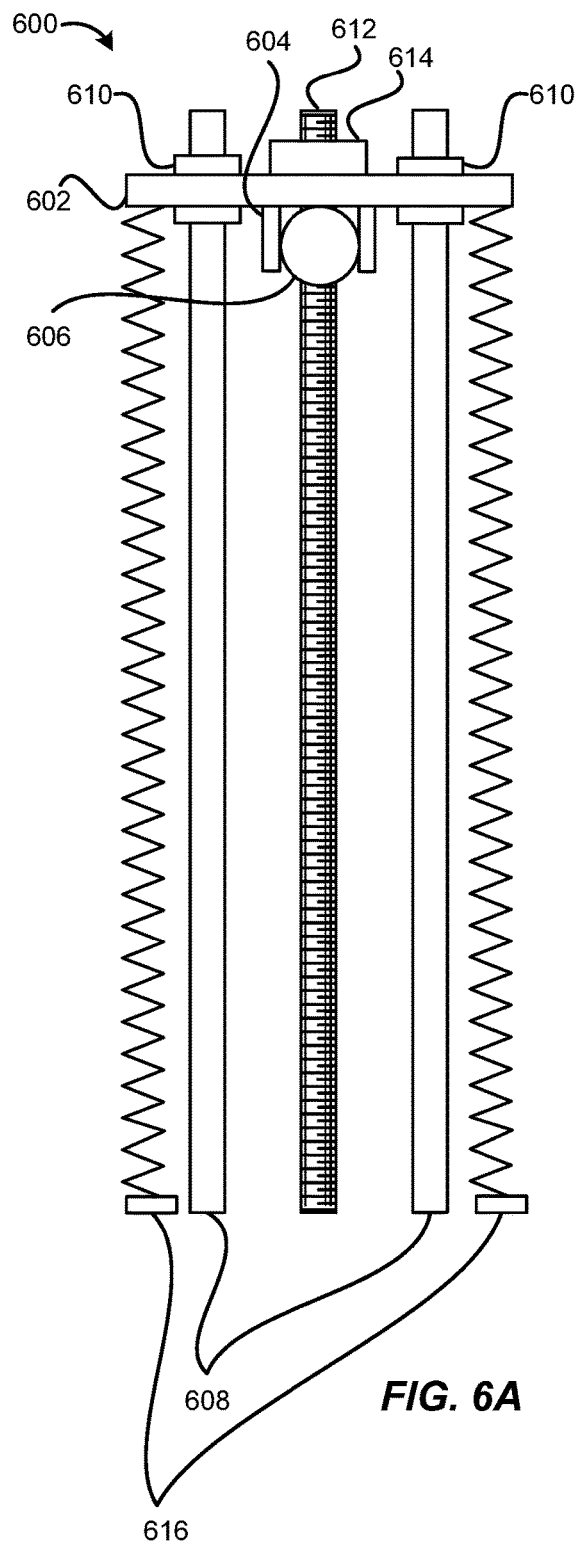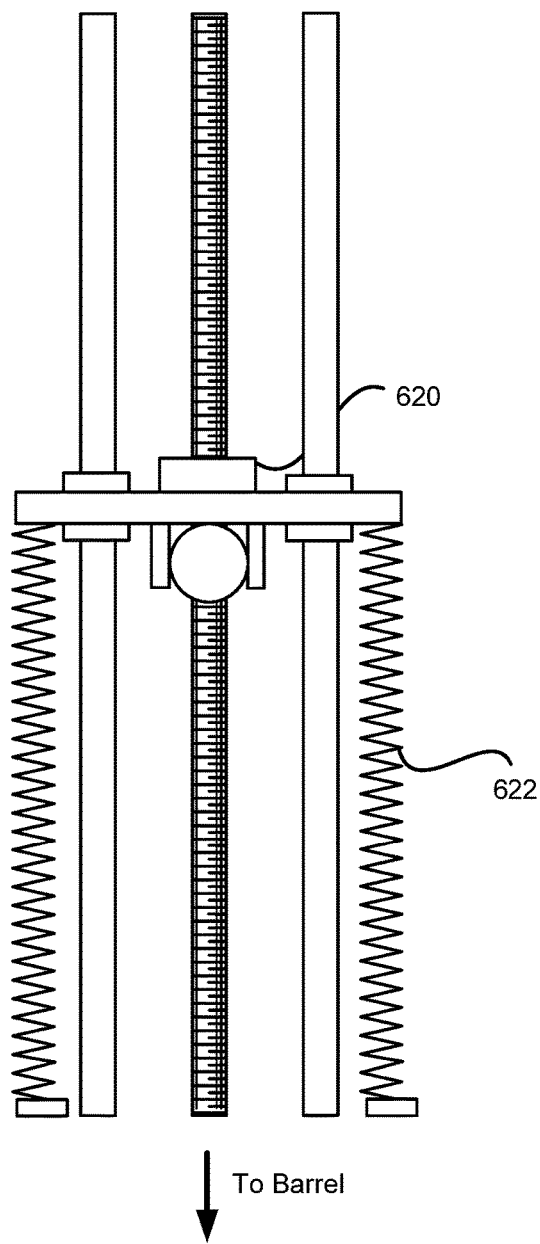
FIG. 6A
FIG. 6B

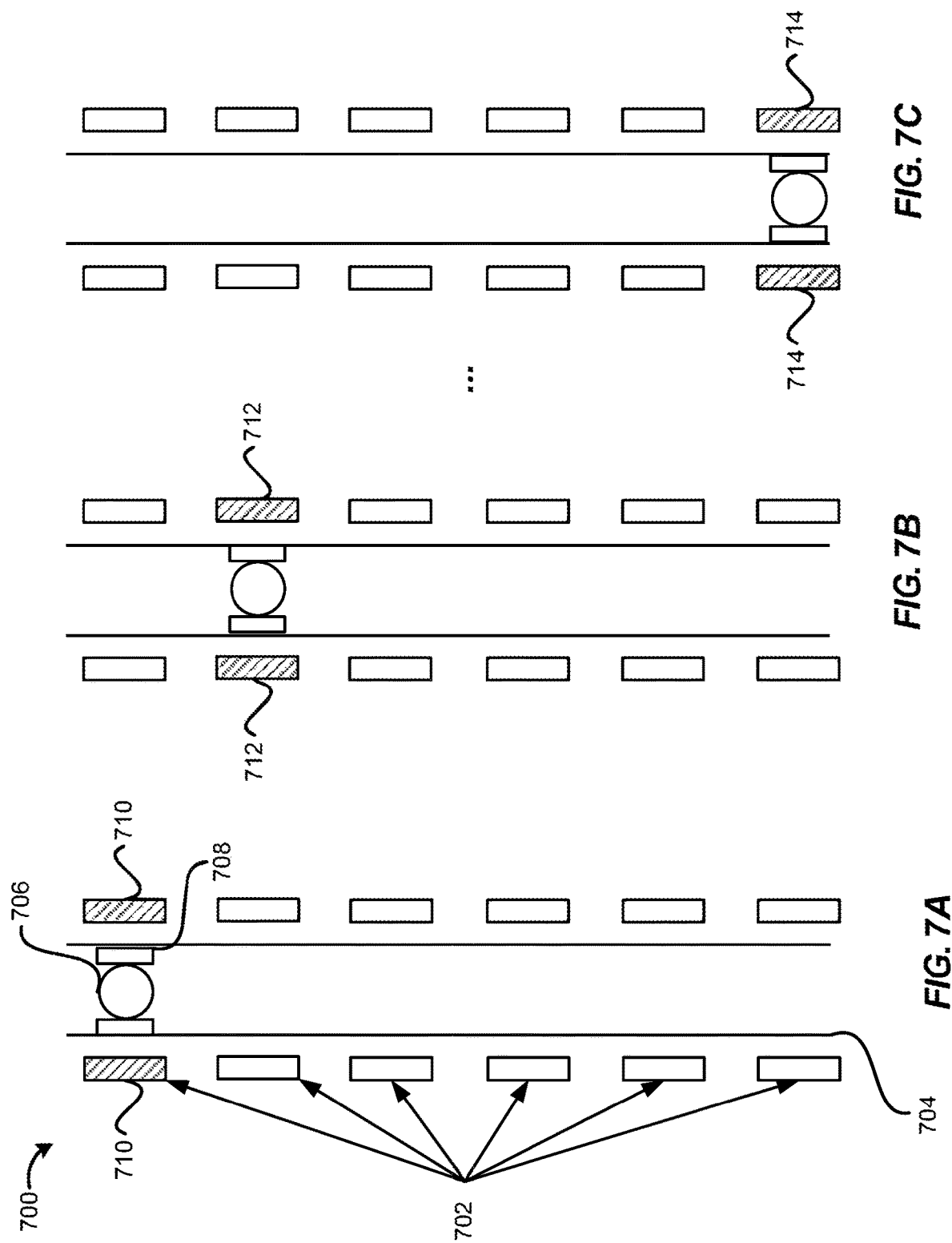

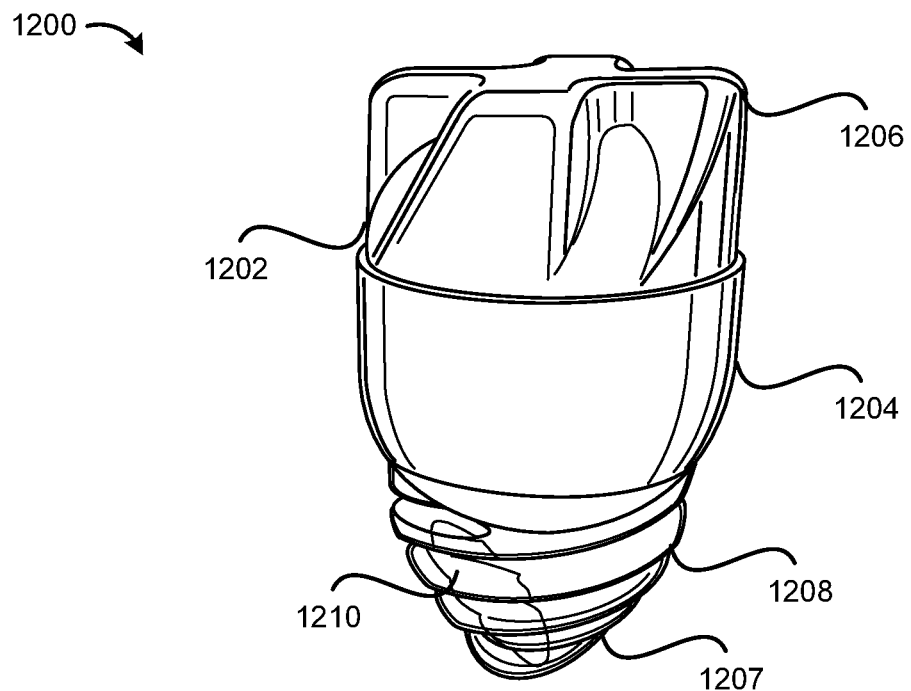
FIG. 12A
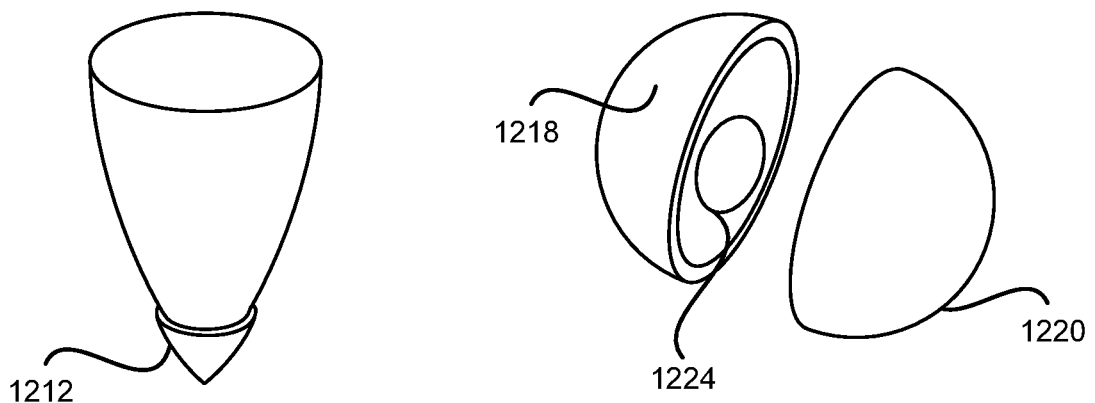
FIG. 12B  FIG. 12C

1400

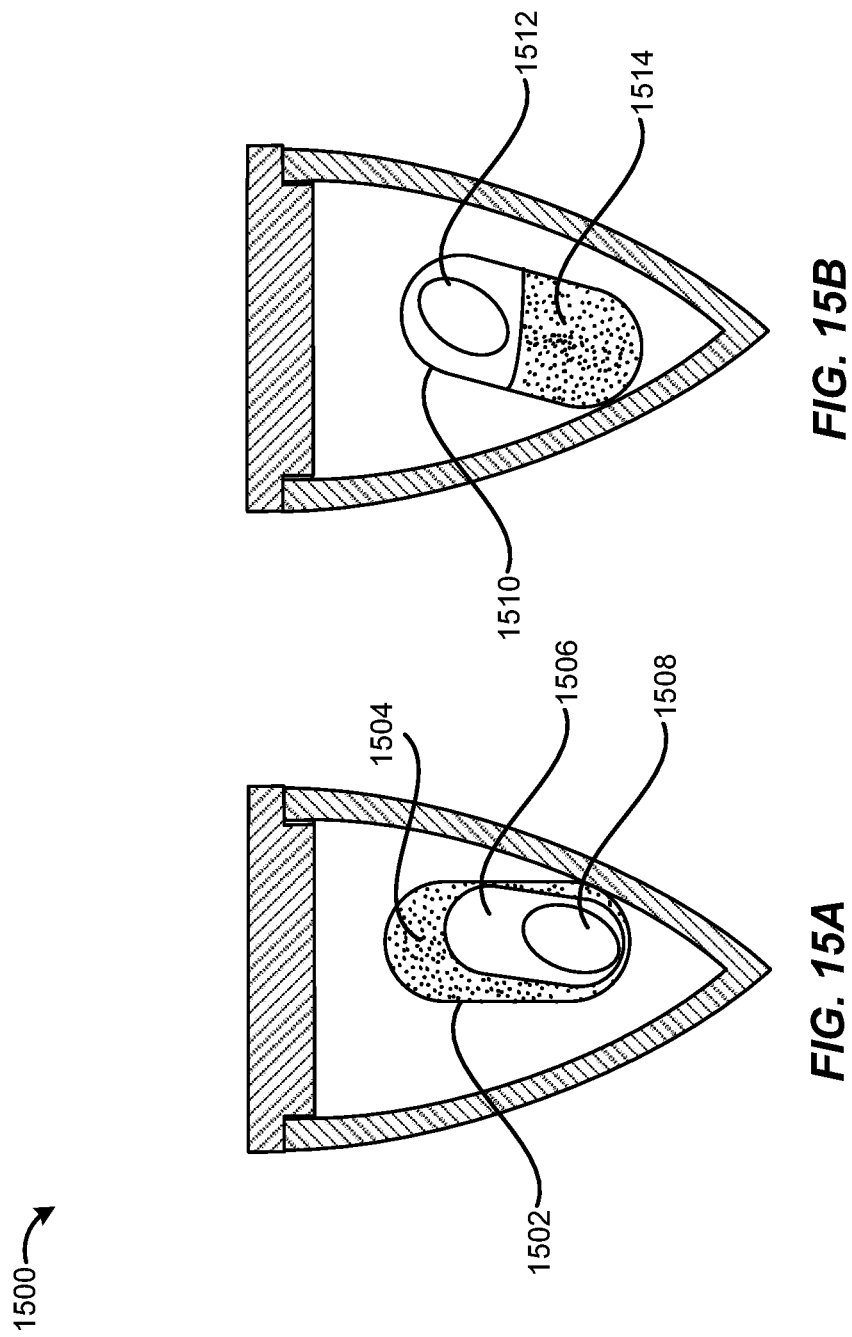

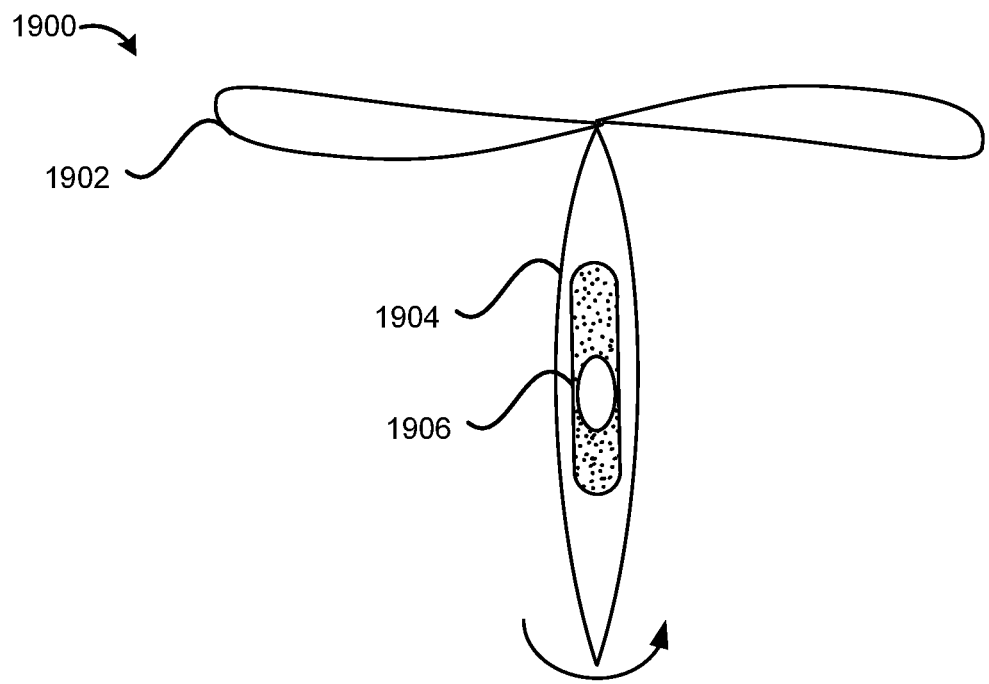
FIG. 19A
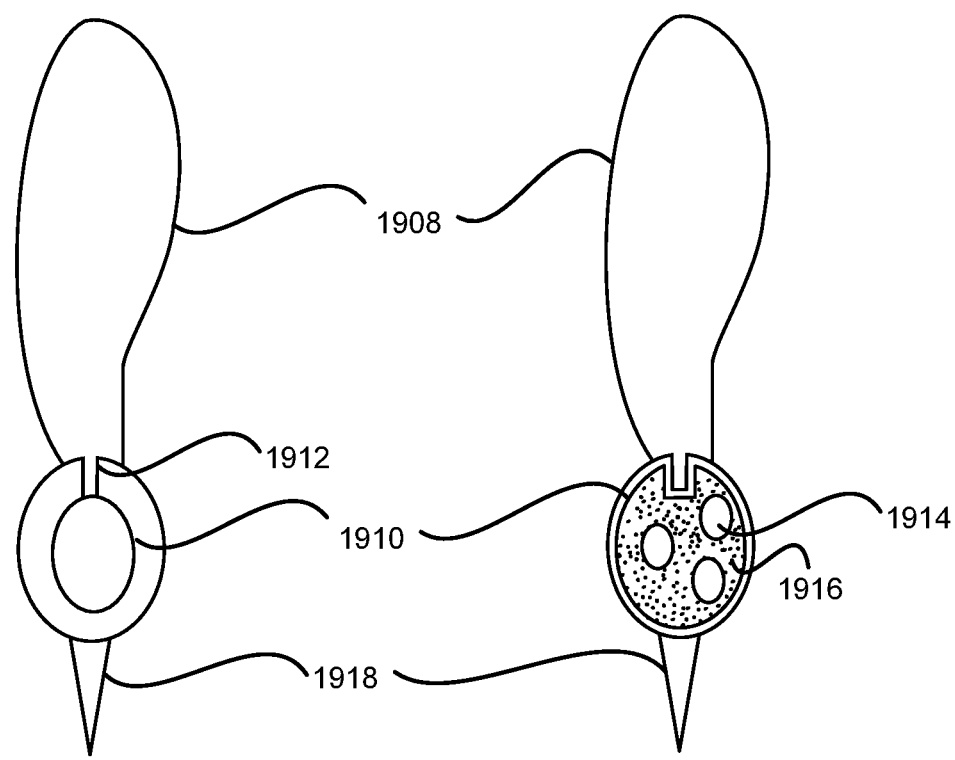
FIG. 19B   FIG. 19C

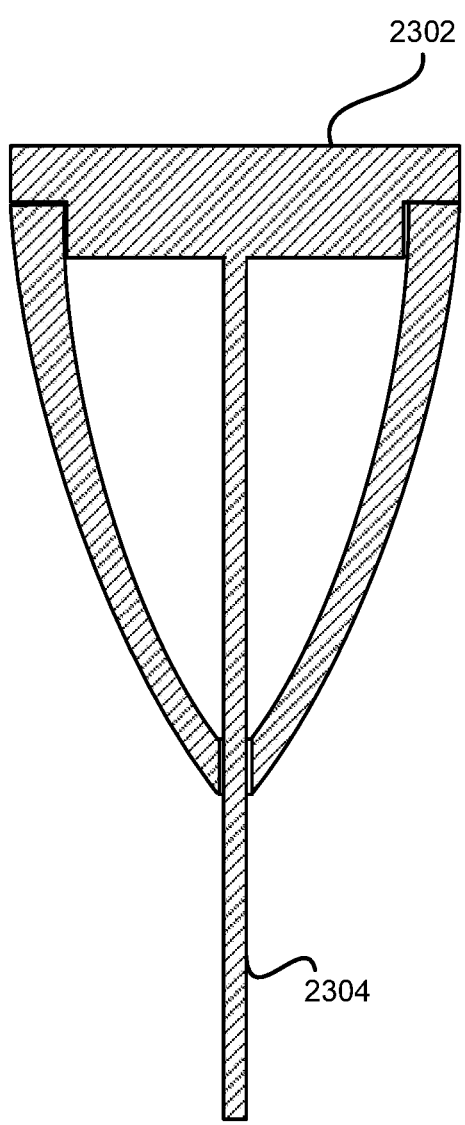
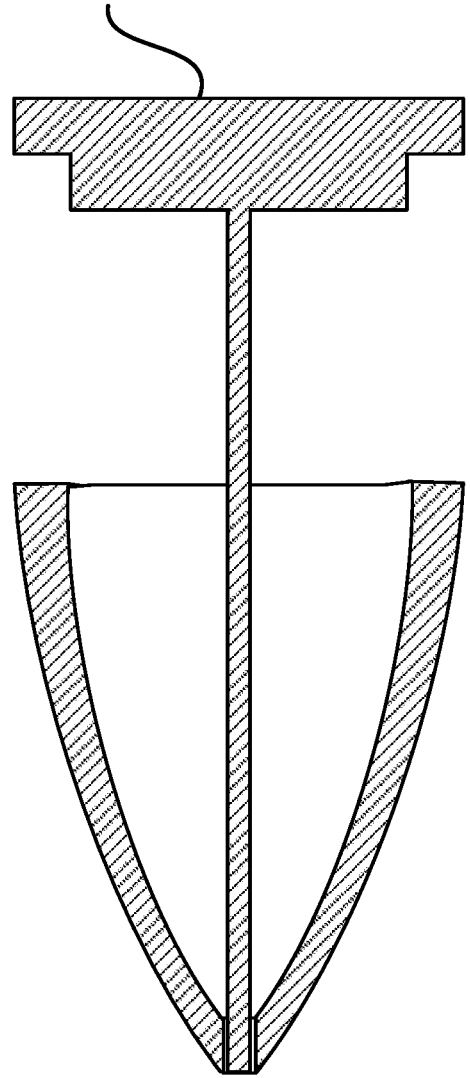
FIG. 23A  FIG. 23B

TECHNIQUES FOR AUTOMATED PLANTING

CROSS-REFERENCE TO RELATED APPLICATIONS

This application claims priority to PCT Application No. PCT/US15/051768 filed Sep. 23, 2015, claiming priority to both U.S. Provisional Application No. 62/054,280, filed Sep. 23, 2014, entitled "An Automated Planting System" and U.S. Provisional Application No. 62/209,227, filed Aug. 24, 2015, entitled "Techniques for Automated Planting," all of which are incorporated herein by reference in their entirety for all purposes.

BACKGROUND

There are a number of known techniques for planting both biological and non-biological objects into and onto ground. The most widely used is manual or hand planting whereby a person carries items, often seeds, saplings or seedlings, on his or her person, selects a location for the object to be planted and plants the object using one of a number of tools such as a spade or some other device. Other techniques may involve the use of land-based machinery such as a tractor, often driven by a person, to plant objects.

These techniques are typically slow and expensive. Although the use of mechanized planting machines does increase the efficiency with which planting activities are conducted, the machines are not appropriate for use in rugged or inaccessible terrain.

Embodiments of the present invention provide techniques that address these and other problems with established planting techniques.

SUMMARY

Embodiments of the present invention provide techniques, including systems and methods, for planting using planting pods (referred to herein as "pods"). A planting system can be configured to deliver pods including a payload (e.g., seeds, cuttings, or other planting materials) into or onto the ground at a predetermined location. In some embodiments, the automated planting system can include a mapping system that receives various sensor inputs and generates a map of a planting area, including terrain characteristics, existing vegetation, etc. A pod planting system may use the map of the planting area to deliver pods to the planting area. The pod planting system may be executed automatically using the maps generated by the mapping system and/or manually by a remote operator. Each pod can include a payload to be planted on or in the ground by the pod planting system. Pods may be customized (e.g., shape, size, payload contents, etc.) depending on the types of plants being planted, the terrain, prior planting results, etc.

Embodiments of the present invention can include a computer-implemented method for automated planting. The method can include receiving input data from a plurality of sensors, processing the input data to generate one or more output maps, and generating a planting pattern for a planting operation using the one or more output maps. The method may further include determining a quantity of planting platforms available, dividing the planting pattern into a plurality of portions based on the quantity of planting platforms available, uploading to each available planting platform a corresponding portion of the plurality of portions, and executing the planting operation using the available planting platforms.

In some embodiments, the planting platforms can include one or more unmanned aerial vehicles (UAVs). In some embodiments, The one or more output maps can include terrain data identifying one or more of structures, terrain types, and debris.

In some embodiments, generating a planting pattern for a planting operation using the one or more output maps can further comprise applying one or more terrain thresholds to the tags in the one or more output maps, and tagging one or more regions of the one or more output maps with threshold data to generate one or more enriched output maps. In some embodiments, generating a planting pattern for a planting operation using the one or more output maps can further comprise comparing the enriched output maps to planting requirements for at least one species of plant, identifying, based on the comparison, one or more planting regions for the at least one species of plant, and defining the planting pattern for the at least one species of plant in the one or more planting region based on a density level associated with the at least one species of plant.

Embodiments of the present invention may include a planting apparatus. A planting apparatus may include a casing comprising an inner surface and an outer surface. A first end portion of the casing can be closed to form a chamber and a second end portion of the casing is open. The planting apparatus may also include a payload in the chamber, the payload including planting material and matrix material. The planting apparatus may further include a lid having a lower surface and an upper surface, the lower surface adapted to seal the second end portion of the casing.

In some embodiments, the casing is made of biodegradable materials and includes a nutrient mixture specific to the payload. In some embodiments, the casing is substantially conical and wherein one or more of the casing and the lid are adapted to break upon impact with a planting environment, exposing the payload to the planting environment.

In some embodiments, a planting apparatus may further include a pushrod connected to the lower surface of the lid and extending through the first end portion of the casing. At impact with a substrate, the pushrod causes the lid to open.

In some embodiments, a planting apparatus can include one or more wings connected to the upper surface of the lid, the one or more wings adapted to cause the planting apparatus to spin when released from a first height. In some embodiments, the outer surface of the casing of the planting apparatus can include one or more stabilization surfaces, the one or more stabilization surfaces adapted to cause the planting apparatus to spin about its axis. In some embodiments, the upper surface of the lid can include one or more stabilization surfaces extending from the upper surface of the lid.

In some embodiments, the planting apparatus can further include one or more sensors integrated with the casing and an energy generation system connected to an energy storage system. The energy storage system can provide energy to the one or more sensors. In some embodiments, the one or more sensors include at least one communication module and at least one environmental sensor, the at least one communication module configured to transmit data from the at least one environmental sensor to a second planting apparatus. In some embodiments, a second planting apparatus including a second communication module can be configured to transmit data received from a plurality of planting apparatuses to a base station.

Embodiments of the present invention can include an automated planting system. The automated planting system can include a planting system including a chamber connected to a trigger-controlled firing mechanism, a barrel, and a feeder. The trigger-controlled firing mechanism is configured to direct a pod fed into the chamber by the feeder, through the barrel. The automated planting system can further include a trigger control system connected to the trigger-controlled firing mechanism and configured to receive data from one or more sensors. The trigger control system can be configured to determine a position of the mobile transport platform using the one or more sensors, compare the position of the mobile transport platform to a first location in a planting pattern, determine that the position is within a threshold distance of the first location, and cause the trigger-controlled firing mechanism to fire a pod at the first location.

In some embodiments, the automated planting system can further include a mobile transport platform coupled to the planting system, the mobile transport platform including the one or more sensors. In some embodiments, the mobile transport platform is a unmanned aerial vehicle.

In some embodiments, the firing mechanism can include a high pressure chamber connected to the chamber via an electronically controlled valve. When the trigger control system causes the trigger controlled firing mechanism to fire the pod by opening the electronically controlled valve. In some embodiments, the high pressure chamber includes a compressed gas cylinder that pressurizes the high pressure chamber.

In some embodiments, the planting system can be rotatably coupled to the mobile transport platform using a gimbal.

In some embodiments, the automated planting system can further include a mapping system configured to receive data from the one or more sensors. The mapping system generates the planting pattern based on the data from the one or more sensors.

BRIEF DESCRIPTION OF THE DRAWINGS

Various embodiments in accordance with the present disclosure will be described with reference to the drawings, in which:

FIGS. 5A and 5B illustrate a diagram of an alternative pod delivery apparatus, in accordance with an embodiment of the present invention;

FIGS. 6A and 6B illustrate a diagram of an alternative pod delivery apparatus, in accordance with an embodiment of the present invention;

FIGS. 7A-7C illustrate a diagram of an alternative pod delivery apparatus, in accordance with an embodiment of the present invention;

FIGS. 12A-12C illustrate examples of pods, in accordance with embodiments of the present invention;

FIGS. 15A and 15B illustrate examples of pod inner capsules, in accordance with embodiments of the present invention;

FIGS. 19A-19C illustrates examples of gravity pods, in accordance with embodiments of the present invention;

FIGS. 23A and 23B illustrate an example of an impact-actuated lid, in accordance with an embodiment of the present invention;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

There are a number of known techniques for planting both biological and non-biological objects into and onto ground. The most widely used is manual or hand planting whereby a person carries items, often seeds, saplings or seedlings, on his or her person, selects a location for the object to be planted and plants the object using one of a number of tools such as a spade or some other device. Other techniques may involve the use of land-based machinery such as a tractor, often driven by a person, to plant objects. Manual techniques can lead to worker injury and can be difficult to implement in remote or difficult terrain.

Embodiments of the present invention provide techniques, including systems and methods, for planting using planting pods (referred to herein as "pods"). An automated planting system can be configured to deliver pods including a payload (e.g., seeds, cuttings, or other planting materials) into or onto the ground at predetermined locations. In some embodiments, the automated planting system can include a mapping system that receives various sensor inputs and generates a map of a planting area, including terrain characteristics, existing vegetation, etc. A pod planting system may use the map of the planting area to deliver pods to the planting area. The pod planting system may be executed automatically using the maps generated by the mapping system and/or manually by a remote operator. Each pod can include a payload to be planted on or in the ground by the pod planting system. Pods may be customized (e.g., shape, size, payload contents, etc.) depending on the types of plants being planted, the terrain, prior planting results, etc.

In some embodiments, control features can include a pod targeting apparatus and control software which automates the activities of the planting system. The control software can coordinate activities of the individual pod planting systems to so as to improve efficiencies and reduce the likelihood of individual planting platforms colliding with other platforms or objects. The individual planting platforms can be controlled individually or as a group.

Figure 1:
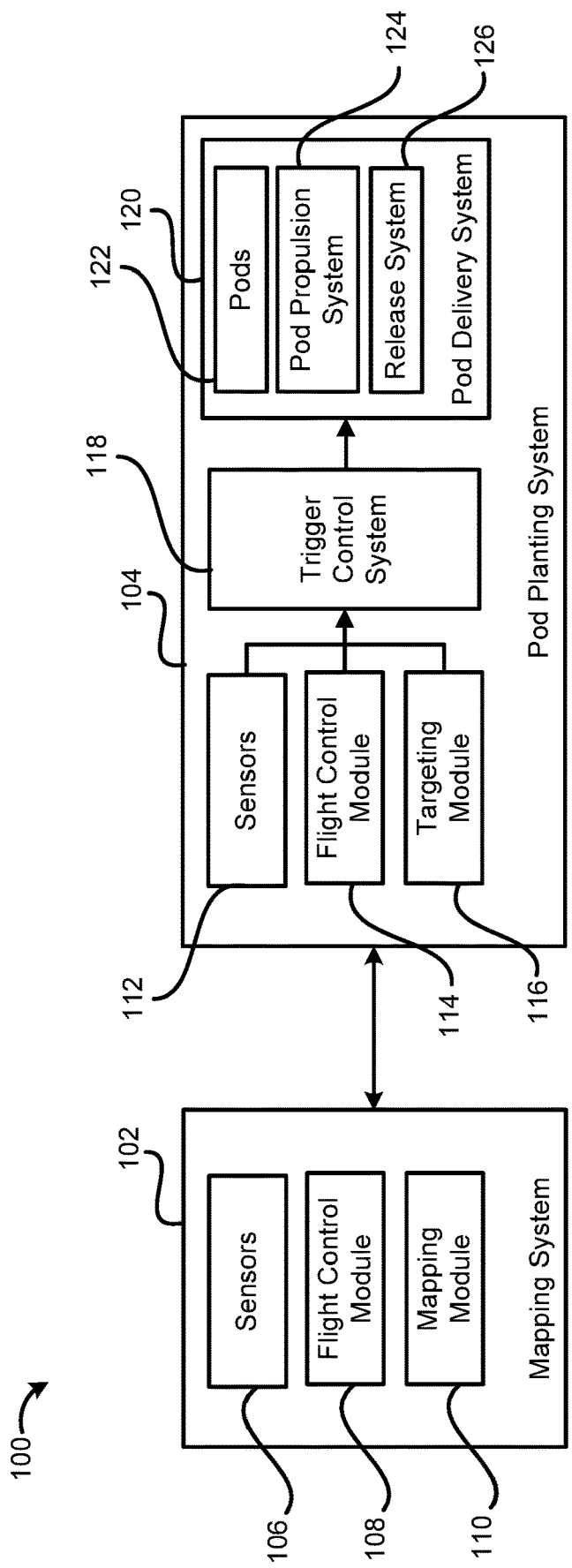
FIG. 1 illustrates an example of an automated planting system, in accordance with embodiments of the present invention.

FIG. 1 illustrates an example of an automated planting system 100, in accordance with embodiments of the present invention. As shown in FIG. 1, automated planting system 100 may include a mapping system 102 and a pod planting system 104. Mapping system 102 and pod planting system 104 may each be implemented in a mobile transport platform, such as an unmanned aerial vehicle (UAV), airplane, helicopter, satellite, or other mobile platform. Although embodiments of the present invention are generally discussed with reference to a UAV, any other mobile platform may also be used. In some embodiments, a single mobile transport platform may include mapping system 102 and pod planting system 104. In some embodiments, mobile transport platforms may include one of mapping system 102 and pod planting system 104 and may be configured with the components specific to that particular system.

As shown in FIG. 1, mapping system 102 may include sensors 106, flight control module 108, and mapping module 110. In some embodiments, sensors 106 can include electromagnetic sensors such as visual, multispectral, hyperspectral, RADAR, LiDAR, and infrared sensors. In some embodiments, sensors 106 of mapping system 102 can include one or more wireless communication modules including GPS or other wireless tracking data, GSM or other mobile networking module. In some embodiments, current, historic and predicted weather data can be received on a dedicated weather communications device. In some embodiments, flight control module 108 can include control and guidance systems specific to the mobile platform in use. For example, for a quad copter style UAV, flight control module 108 may include controllers for each rotor and a collision avoidance system. The position, direction, and velocity of the UAV may then be controlled based on the independent control of each rotor. In some embodiments, mapping module 110 can identify geographic and geological features of an area using sensor data gathered by sensors 106. Embodiments of the mapping system are described in more detail below.

In some embodiments, pod planting system 104 can include one or more sensors 112, flight control module 114, and targeting module 116. In some embodiments, sensors 112 can include a GPS module, visual, multispectral, hyperspectral, RADAR, LiDAR, and infrared sensors, and visual cameras which register where each pod is planted and record the surroundings of the pod delivery process. In some embodiments, sensors may include communication modules such as receivers, transmitters, transceivers, etc. Flight control module 114 can include a communications module to obtain flight commands from a user, other mobile transport platform, or other system. Targeting module 116 can include a communications module to obtain targeting commands from a user, other mobile transport platform, or other system. In some embodiments, targeting module 116 can automatically send a fire command to trigger control system 118 based on location (e.g., when current GPS location is within a threshold distance of a pre-defined location). In some embodiments, targeting module 116 can send a fire command to trigger control system 118 at predefined intervals. For example, once it is determined that pod planting system 104 is at a specified location, a fire command is sent when pod planting system traverses a predefined distance. In some embodiments, once pod planting system 104 is near a predefined location, a live display of the target area as viewed from pod planting system 104 is displayed to a user, enabling the user to select a particular location prior to sending the fire command.

In some embodiments, trigger control system 118 can manage planting using pod delivery system 120. For example, trigger control system 118 can determine a geographic position of the mobile transport platform using data received from flight control module 114 and compare it to a planting pattern. If the geographic position of the mobile transport platform is within a threshold distance of a location on the planting platform, the trigger control system 118 can send trigger the release of a pod. In some embodiments, trigger control system 118 can mechanically cause a stop to be released in release system 126 and or cause pod propulsion system 124 to fire. In some embodiments, trigger control system 118 can include an alignment aid using a downward pointing projector or laser to show where the pod may be planted on the ground before it is fired. When trigger control system determines that pod planting system is aligned on target (e.g., based on the comparison of the pod planting system location to the planting pattern and/or using the alignment aid) trigger control system 118 can instruct pod delivery system 120 to fire.

In some embodiments, trigger control system 118 can include a safety system to reduce the risk of a pod hitting a person or animal. For example, a thermal imager can be used to detect a warm object within a target area. In some embodiments, a range finder, such as an ultrasound or infrared range finder can be used to detect is an object is in the target area and disable the firing mechanism. In some embodiments, a visual recognition system can be paired with a thermal imager to identify objects in the target area. The safety system can send an alert to a user to review the target area when an object is detected. In some embodiments, where automated planting is in use, the release system 126 can be disabled and the pod planting system 104 can be instructed to relocate to the next target.

In some embodiments, the pod delivery apparatus can be paired with a head worn eye display which augments the visual field of view to show the targeting area. The targeting area can be shown with an overlay that can identify one or more of the planting pattern, locations where it is safe to plant, locations where it is not safe to plant, and/or preferred planting areas. In some embodiments, the overlay can be filtered based on species, type of pod, and other planting data. When an area is detected by the safety system, a projected image (e.g., red cross) can be projected to show that it is not safe to fire. The safety system can be set to either automatically disable the firing mechanism, or simply be used as a manual aid.

As shown in FIG. 1, pod delivery system 120 can include one or more pods 122, a pod propulsion system 124, and/or a pod release system 126. As described further below, each pod can include a pod casing, a lid, and a payload. The payload can include planting material (such as a seed or seedling) and a support matrix/gel (such as soil, nutrients, or other material). The payload can vary depending on the type of seed included in the pod and the conditions of the planting location. Planting material may include various types of seeds, cuttings, or other plant material that may be sown. In some embodiments, the casing and/or lid may be designed to collapse or pierce upon firing, landing on or entering into the ground, so as to allow the seed to grow out of the pod immediately and allow water to enter.

The pod propulsion system 124 can include a pneumatic or hydraulic propulsion system in which high pressure gas or water is introduced to a chamber including a pod which forces the pod down a barrel and towards a target. In some embodiments, high pressure gas can be generated through a chemical reaction (e.g., using gun powder or other solid or liquid propellant) or through a compressed gas cylinder. Pod propulsion system 124 may also include mechanical or electrical launching mechanisms. Pod release system 126 can be used to drop gravity pods that do not require additional propellants. Embodiments of pod planting system 104 are discussed further below.

Figure 2:
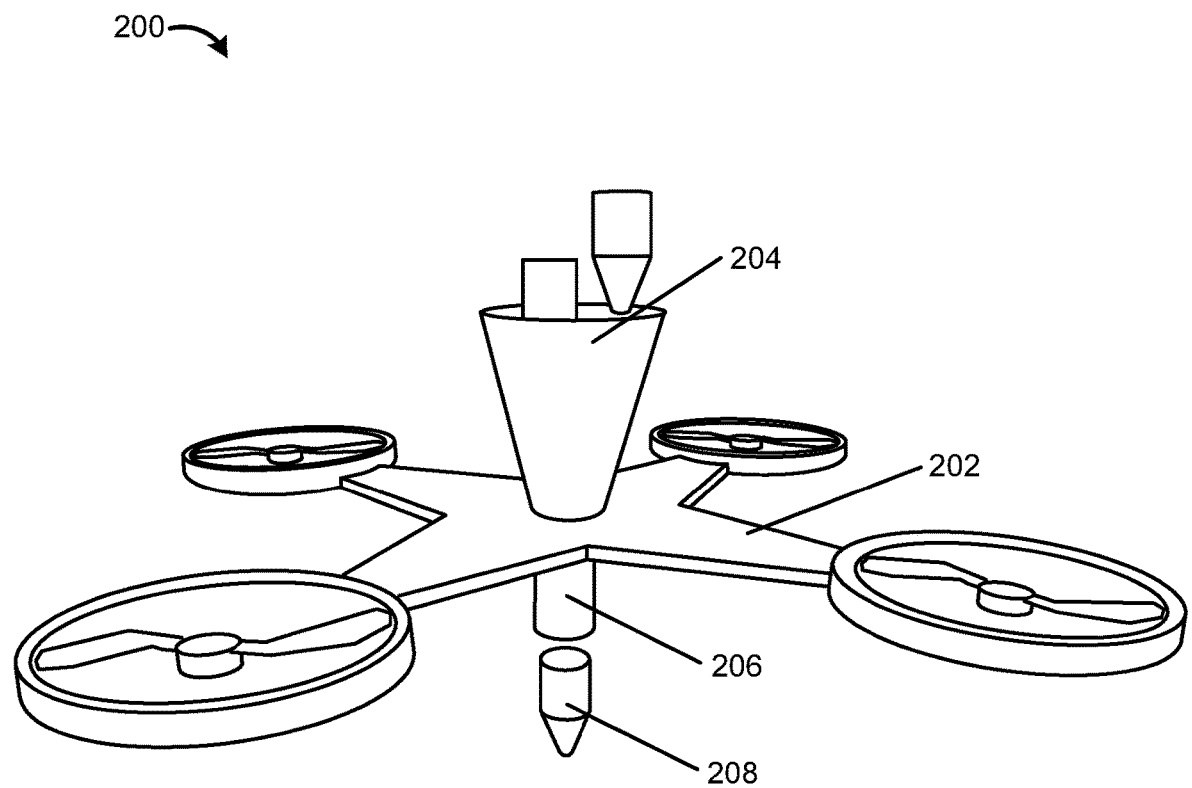
FIG. 2 illustrates an example of a pod planting system, in accordance with an embodiment of the present invention.

FIG. 2 illustrates an example of a pod planting system 200, in accordance with an embodiment of the present invention. As shown in FIG. 2, a pod planting system can include a mobile transport platform 202, such as an unmanned aerial vehicle (UAV), a feeder 204, a planting apparatus 208, and pods 210 for planting. In some embodiments, platform 202 can be a quadcopter-style UAV or drone. In some embodiments, platform 202 can include any of a fixed wing drone, rotary-controlled drone, blimp, manually operated plane or helicopter, ultra-light glider, or other aerial vehicle. In some embodiments, platform 202 can include various land-based vehicles such as a tractor, automobile, bicycle, motorcycle, hand pushed cart, animal-drawn attachment, land based robotic system, or any other land-based platform.

In some embodiments, the pod planting system 200 can include a multiple storage areas including feeder 204 that includes pods that are ready to plant, and a cold storage system that may hold pods while in transit, before the pods are ready to plant. In some embodiments, cold storage systems may be maintained at various locations accessible to the pod planting system where the pod planting system can receive pods while en route to planting locations. Cold storage may be used to reduce the growth rate of the seeds and/or to preserve the seeds.

As shown in FIG. 2, mobile platform 202 can be integrated with feeder 204 and planter apparatus 208 into a single pod planting system 200. In some embodiments, planter apparatus 208 can be mounted directly to mobile platform 202, or can be mounted via a gimbal system that can direct the pod planting system in any direction. In embodiments where planter apparatus 208 is mounted via a gimbal, it may be centered onto the bottom of platform 202 providing a near 360 degree view of the ground and the platform's surrounds. Use of a gimbal can improve targeting accuracy in adverse weather conditions (for example, when high winds cause platform 202 to drift), as well as during planting operations on steep hills where a pod is needed to plant into the hill.

In some embodiments, the planting components (e.g., feeder 204, planter apparatus 208) can be connected to a separate platform (e.g., drone or other UAV), such as through a rail-mounted accessory connector or other connection, or may be incorporated into a standalone device. For example, pod delivery apparatus 204 can be incorporated into a ground based system, such as a tractor or land based drone. In some embodiments, pod delivery apparatus 204 can be used as a handheld system. For example, pod delivery apparatus 204 can include a handle or strap and a manually operated trigger mechanism, enabling the pod delivery apparatus to be manually aligned and fired. In some embodiments, pod delivery apparatus 204 can be configured to be strapped to a user's leg. A pressure sensor at the muzzle of pod delivery apparatus 204 can detect the user's steps and trigger control system 118 can fire pod delivery apparatus. Such manually operated embodiments reduce risk to human operators using manual tools, such as shovels, and risk of injury due to repetitive motion in difficult terrain. Additionally, pods not tailored for flight may be used with manually operating planting components.

In some embodiments, pod delivery apparatus 204 may include a targeting apparatus including an on-board navigation system which uses the data from GPS or other sensors to determine the location of the pod planting system 200 in relation to the planting locations as identified in a planting pattern. The targeting apparatus can be used to coordinate the positioning of the pod planting system 200 according to the planting pattern, enabling the delivery of pods to specified locations in or on the ground.

In some embodiments, the pod delivery apparatus 204 may include control software which automates the activities of the aerial and/or land-based mobile transport platform 202 and the pod delivery apparatus 204 based on the planting patterns. In some embodiments, where the pod planting system includes multiple mobile transport platforms the control software can coordinate the activities of each mobile transport platforms 202 so as to reduce the risk of collision between mobile transport platforms 202 and other obstacles, and attempt to improve the efficiency of the planting activities of the pod planting system 200.

In some embodiments, pod delivery apparatus 204 may include an on-board sensor device which can capture data relating to pods delivered by the pod delivery apparatus. For example, each pod can include various sensors that detect the position, orientation, structural integrity, and environmental conditions associated with the pod at planting. This data may be communicated from the pod to pod delivery apparatus 204 and used to confirm, e.g., whether the pod has been delivered to the correct location, whether the pod has been damaged, and if so, the degree to which the pod has been damaged, confirm the degree (e.g., depth) to which the pod has penetrated the ground, confirm the angle at which the pod has been delivered into the ground, and/or confirm whether the pod delivery apparatus has misfired or otherwise malfunctioned.

In some embodiments, platform 202 can carry a GSM module (modem to communicate in receive and transmit) and report without going through the ground station if GSM connectivity is available. This allows for the possibility of sponsorship of individual pods or particular plantings. When the pod is planted, the platform can record and upload a short video along with the GPS coordinates of the planting. In some embodiments video capture can be initiated by the trigger for the firing mechanism to only capture each seed pod which is fired. In some embodiments, video upload occurs after each pod is planted.

In some embodiments, the mobile transport platform can be launched from a variety of platforms. For example, land-based platforms can be launched from land, bench, automotive vehicle, launching device (e.g., catapult), manual (e.g., thrown); water-based platforms can be launched, e.g., directly off the water, off water fixtures (e.g., jetty, raft), off water vehicles (e.g., boat); aerial-based platforms can be launched, e.g., from another drone (for example long flight time fixed wing aircrafts), manned aircraft, blimp, etc. Launching the drones from a variety of platforms allows a greater reach of the planting drones into remote areas.

Figure 3:
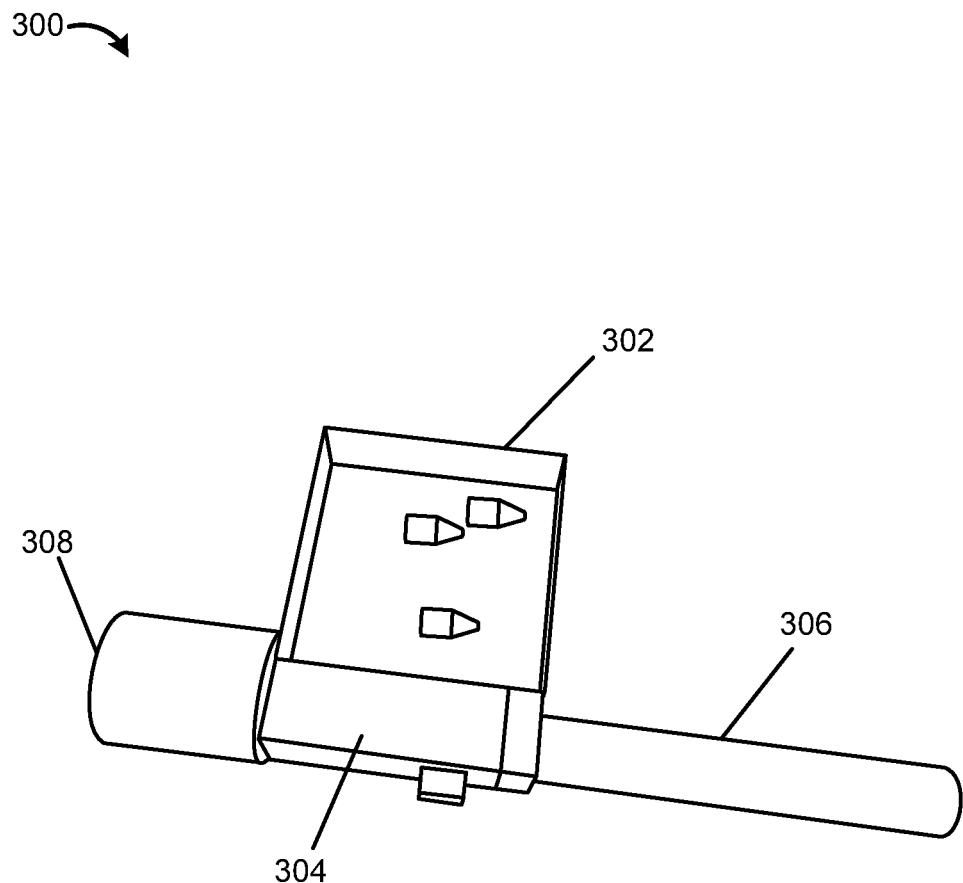
FIG. 3 illustrates a high level diagram of a pod delivery apparatus, in accordance with an embodiment of the present invention.

FIG. 3 illustrates a high level diagram of a pod delivery apparatus 300, in accordance with an embodiment of the present invention. As shown in FIG. 3, a pod delivery apparatus can include a feeder 302, which loads pods into a chamber 304 which is connected to a barrel 306. A firing mechanism 308 may direct a pod loaded into chamber 304 by feeder 302 through barrel 306 toward a target area. In some embodiments, firing mechanism may direct the pods using a propellant including a solid, liquid, or gas propellant which may be fired using an electric or mechanical trigger. Upon ignition, the propellant gas may be directed into the chamber, forcing the pod out of the pod delivery apparatus through the barrel. In some embodiments, firing mechanism 308 may include compressed gas which is released through an electrically controlled valve to be used as propellant. In some embodiments, firing mechanism 308 may direct the pods through the barrel by activating a release, which causes the pods to drop through the barrel without the use of a propellant. In some embodiments, firing mechanism 308 can include a mechanically activated spring-propelled chamber. The spring-propelled chamber can be released using an electronically controlled valve, trigger, or other release mechanism. A trigger control system can release the spring upon firing, propelling, the pod down the barrel. The spring can be re-loaded between shots manually (e.g., by a user cocking the spring) or automatically (e.g., an electronically controlled loading mechanism).

In some embodiments, feeder 302 can include a hopper (e.g., container which funnels pods into the loading chamber using a gravity feed.). As discussed further below, pods can include stabilization and orientation surfaces that manage and control the pods in flight. A hopper can be used with, e.g., gravity pods that are released without the use of additional propellants or in applications where precise orientation and feeding of pods is not required.

In some embodiments, feeder 302 can include a fixed or removable magazine, into which each pod is loaded. For example, a box magazine may be used and operate similarly to magazines used in firearms and air guns, and include a spring loaded follower into which the pods are loaded. As each pod is fired, the spring pushes the next pod into position. In some embodiments, the magazine can include moisture sensors and pressure sensors to detect if any pods have broken open or degraded in the cartridge. Similarly, a tube or drum magazine may be used to feed pods into chamber in place of a box magazine. In some embodiments, pods may be loaded into a belt and fed into chamber 304. An electrically or mechanically controlled ratchet mechanism can then feed the belt through the chamber.

Although a single feeder is shown connected to a single barrel, this is for simplicity of description and is not intended to be limiting. As discussed further below with respect to FIG. 6, in some embodiments, multiple feeders may be connected to a single barrel. In some embodiments, the pod delivery apparatus may include multiple barrels, each connected to one or more feeders. In some embodiments, a feeder may include different types of pods. As discussed further below, specialized pods designed to break up soil, add nutrients, or otherwise prepare an area for planting may be mixed with seed pods in the feeder at a particular ratio for given terrain conditions.

In some embodiments, barrel 306 can be a cylindrical barrel with a bore diameter corresponding to the size of the pods being used. Larger diameter bores can accommodate larger pods, and smaller diameter bores can accommodate smaller pods. In some embodiments, where different sized pods are used with the same barrel, pods may include a sabot to ensure an adequate seal between the pod and sabot and the barrel. In some embodiments, barrel length may vary from a length substantially equivalent to the length of a pod up to several meters in length (e.g., extending from the mobile platform to the ground).

In some embodiments, a barrel with a dynamically adjustable bore diameter may be used. The barrel may be made of a flexible material and may be adjustable using one or more diaphragms (such as like the iris of a camera) arrayed the length of the barrel providing a near-cylindrical barrel that can be adjusted for the size of the pods. This removes the need for multiple sized barrels to accommodate multiple sized pods.

In some embodiments, barrel 306 can be smooth bore or rifled. Where the barrel is rifled, the twist rate of the rifling may be selected based on the type of propellant used, the size and weight of the pod used, the length of the barrel and other factors to ensure that the rifling is sufficient to stabilize the pod in flight. Conventional or polygonal rifling may be used. As discussed further below, in some embodiments, each pod may include fins or other control surfaces that impart spin after leaving the barrel, improving accuracy of the pods in flight. These pods do not require additional stabilization and may be fired from smooth bore barrels.

In some embodiments, firing mechanism 308 can include a pneumatic or hydraulic operated system. As discussed further below with respect to FIG. 4, in some embodiments pressurized gas, from a compressed gas cylinder or generated through a chemical reaction (e.g., gun powder or other propellant), can be passed from a high pressure chamber to a low pressure chamber (e.g., chamber 304) through a valve, forcing the pod through the barrel. The valve can be opened by an electrical solenoid which is controlled by a trigger mechanism. The valve can be inline between the pressurized gas chamber and the pod chamber. In some embodiments, pressurized water may be used in place of pressurized gas. Water can be passed from a high pressure chamber to a low pressure chamber through a valve, the water then pushes the pod through the barrel. This has the advantage of watering the pod and the ground immediately on delivery.

In some embodiments, a mechanical firing mechanism may be used. For example, a single or dual spinning wheel system (like an automatic baseball pitcher or cricket bowler) can be used to fire each pod using the angular momentum of the wheel. In some embodiments, a robotic arm can be used to reach from the pod delivery system, plant the pod directly into the ground and either prepare the land by digging a hole or simply push the pod into the ground. In some embodiments, mechanical energy can be stored in an elastic band and/or spring which may be transferred to a pod directly or through a piston.

In some embodiments, a gravity release system can be used. Pods may be passed into the chamber through a hopper or similar feeder. A stop in the chamber or in the barrel may be actuated by a trigger which releases a pod down the barrel. The pod falls down the barrel by gravity toward the target. In some embodiments, a targeting system can time the release of each pod based on sensor data tracking the velocity of the pod delivery apparatus.

Pod delivery apparatus 300 can further include a trigger, which may include a mechanical or electronic module that initiates the firing of the pod. This module can be directly connected to an on board computer from which it receives firing instructions, or connected wirelessly from a ground station or via a human operator. In some embodiments, the trigger can have a fail-safe mechanism (e.g., an electronic command to instruct the trigger that it is permitted to fire based on the target area acquisition, the pod planting mechanism is in a 'safe to fire' region (i.e. not in predetermined out-of-bounds areas); linked to a monitor of the firing mechanism that it is in a fit state to fire). In some embodiments, the firing mechanism can include a microcontroller and support electronics communicating over a wired or wireless serial command channel to receive firing instructions.

Figure 4:
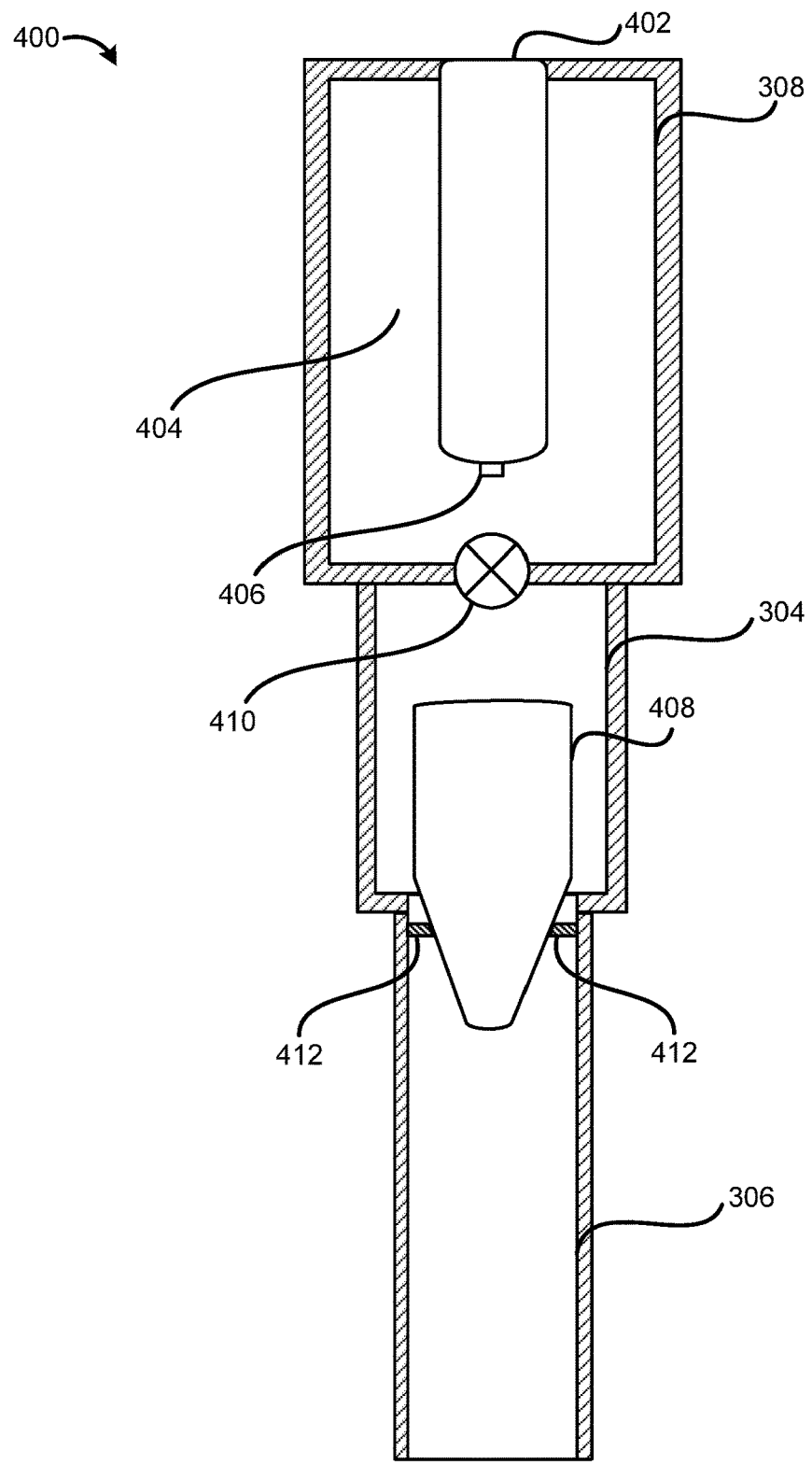
FIG. 4 illustrates a diagram of a pod delivery apparatus, in accordance with an embodiment of the present invention.

FIG. 4 illustrates a diagram of a pod delivery apparatus, in accordance with an embodiment of the present invention. The example shown in FIG. 4 uses a compressed gas cylinder as propellant. This is provided for simplicity of explanation. As discussed above, various forms of propellant and firing mechanisms may be used with embodiments of the present invention.

As shown in FIG. 4, a compressed gas cylinder 402 can be inserted in firing mechanism 308. Compressed gas cylinder 402 can include air, carbon dioxide, nitrogen, or any other compressed gas. In this embodiment, firing mechanism 308 includes a high pressure chamber 404 and a valve 406 connected to compressed gas cylinder 402. Valve 406 can include a threaded valve assembly, into which compressed gas cylinder 402 is connected, enabling new cylinders to be added when old cylinders are exhausted. When a compressed gas cylinder is connected to valve 406, compressed air can be released until equilibrium is reached in high pressure chamber 404. In some embodiments, high pressure chamber 404 can include a pressure sensor configured to measure the pressure in high pressure chamber 404. Valve 406 can be computer controlled valve connected to the pressure sensor and configured to close valve 406 once a predetermined pressure has been reached in high pressure chamber 404. This allows for the pressure of the propellant gas to be controlled based on application. For example, different pods may be able to handle different amounts of pressure before structurally failing. Additionally, depending on the type of seed being planted, different planting depths may be required. By managing the pressure in high pressure chamber 404, planting depth can be controlled across different terrains.

In some embodiments, an on board compressor may be used in place of a compressed gas cylinder. The compressor may be configured to pressurize high pressure chamber 404 to a predetermined pressure and may be computer controlled to dynamically vary the amount of pressure used.

As described above, firing mechanism 308 can be connected to chamber 304, into which one or more pods 408 are loaded prior to firing down barrel 306. Chamber 304 can be a low pressure chamber connected to high pressure chamber 404 via valve 410. Low pressure chamber 304 may not be pressure controlled or otherwise pressurized (e.g., the pressure may be substantially equivalent to ambient air pressure). In some embodiments, valve 410 can be a mechanically or electrically triggered valve. Barrel 306 or chamber 304 can include one or more flexible stops (e.g., rubber stoppers) 412 to hold pod 408 in position prior to firing. When valve 410 is trigged, high pressure gas from high pressure chamber 404 flows into low pressure chamber 304 and forces pod 408 down barrel 306.

In some embodiments, compressed gas cylinder 402 may be connected directly (or through a valve assembly) to valve 410 such that when valve 410 is actuated, compressed gas from gas cylinder 402 flows through valve 410 into low pressure chamber 304, forcing pod 408 out barrel 306.

FIGS. 5A and 5B illustrate a diagram of an alternative pod delivery apparatus 500, in accordance with an embodiment of the present invention. FIG. 5A shows a pneumatic pod delivery apparatus 500 in a cocked, or ready to fire, position. As shown in FIG. 5A, in the ready to fire position, bolt 502 is in a raised position relative to barrel 504. In some embodiments, pod delivery apparatus can be placed into the cocked position manually, using charging handle 506. Charging handle 506 can connect bolt 502 to striker 508. When cocked, striker 508 is pressed against striker spring 510, loading the striker spring. In some embodiments, one or more trigger-controlled stops 511 in receiver 512 can hold striker 508 in the cocked position. In some embodiments, air pressure can be maintained by regulator 514. As described above, the pressure of the propellant gases can be maintained at different levels depending on the particular planting application. This allows for different pressures to be used for different pods, terrains, and other factors to increase the likelihood of a successful planting. In some embodiments, regulator 514 can be control compressed gas received from a compressed gas cylinder or a compressor (not shown) connected to the regulator.

As shown in FIG. 5B, when fired, trigger-controlled stops 511 can be released. Striker spring 510 may then force striker 508 downward in receiver 512, until it impacts firing valve 516. At impact, firing valve 516 is opened, compressing firing valve spring 518, allowing compressed air to flow from regulator 514 into inlet 520. In the fired position, bolt 502 is aligned 522 with inlet 520 and with barrel 504. The compressed air is directed from inlet 520 through bolt 502 and into barrel 504, propelling pod 524 to the target. After firing, firing valve spring 518 closes firing valve 516 and pod delivery apparatus is ready to be cocked and fired again. In some embodiments, charging handle 506 can be manually cocked by a user or automatically cocked by a cocking mechanism.

FIGS. 6A and 6B illustrate a diagram of an alternative pod delivery apparatus 600, in accordance with an embodiment of the present invention. As shown in FIG. 6A, a mechanical pod delivery apparatus may be used to launch each pod. A gantry 602 may include a pod holder 604 into which a pod 606 is inserted. Gantry 602 can be mounted to rails 608 via linear bearings 610. Gantry 602 may also be connected to a drive screw 612 via a clutch 614. In some embodiments, with clutch 614 engaged a geared motor, or similar mechanism, can turn drive screw 612, raising gantry 602 into a firing position and stretching springs 616. In some embodiments, the firing position gantry 602 is raised to may vary depending on the particular planting application. For example, a higher position may be used where greater force is needed at launch, and a lower position may be used where lower force is needed. As shown in FIG. 6B, when fired clutch 614 is released, disengaging gantry 602 from drive screw 612, allowing springs 616 to pull gantry 602 downward propelling the pod to the barrel.

FIGS. 7A-7C illustrate a diagram of an alternative pod delivery apparatus 700, in accordance with an embodiment of the present invention. In some embodiments, firing mechanism 308 can include a coil gun mechanism to accelerate the pod out of the barrel. As shown in FIG. 7A, arrays of electromagnets 702 can be arranged along a barrel 704. A pod 706 can include metal which is repelled, or attracted from/to the electromagnets. In some embodiments, a pod holder 708, rather than the pod itself, may include the metal portion that is accelerated by the electromagnets. As shown in FIG. 7A, an electronic trigger and initiate an activation sequence of electromagnets positioned along barrel 704. A first set of electromagnets 710 can be activated at the breech-end of the barrel 704. The electromagnets 702 may then be activated in sequence from breech to muzzle to accelerate the pod out of the barrel. For example, as shown in FIG. 7B, the second set of electromagnets 712 has been activated. This sequence may continue until the last set of electromagnets 714 is reached and the pod exits the barrel 704. In some embodiments, stops in the barrel 704 may prevent the pod holder 708 from exiting the barrel. The pod holder may then be returned to the breech-end of the barrel to be loaded with a new pod. In some embodiments, pod holder 708 may exit the barrel with the pod 706. The pod holder may be configured to separate from the pod upon exiting or may be configured with one or more stabilization surfaces to stabilize the pod in flight and/or may be configured to absorb the force of impact upon reaching the target area.

In some embodiments, firing mechanism 308 can include a rail gun mechanism to accelerate the pod out of the barrel. Each pod can include a metal connector which, when loaded into the chamber, completes a circuit across two rails running the length of the barrel. The rails are connected to a power supply, such that when a pod is loaded, current travels down one rail, across the pod, and up the other rail, generating a magnetic force that propels the pod out of the barrel. In some embodiments, a pod holder, rather than the pod itself, may include the metal connector that is accelerated by the electromagnets.

Figure 8:
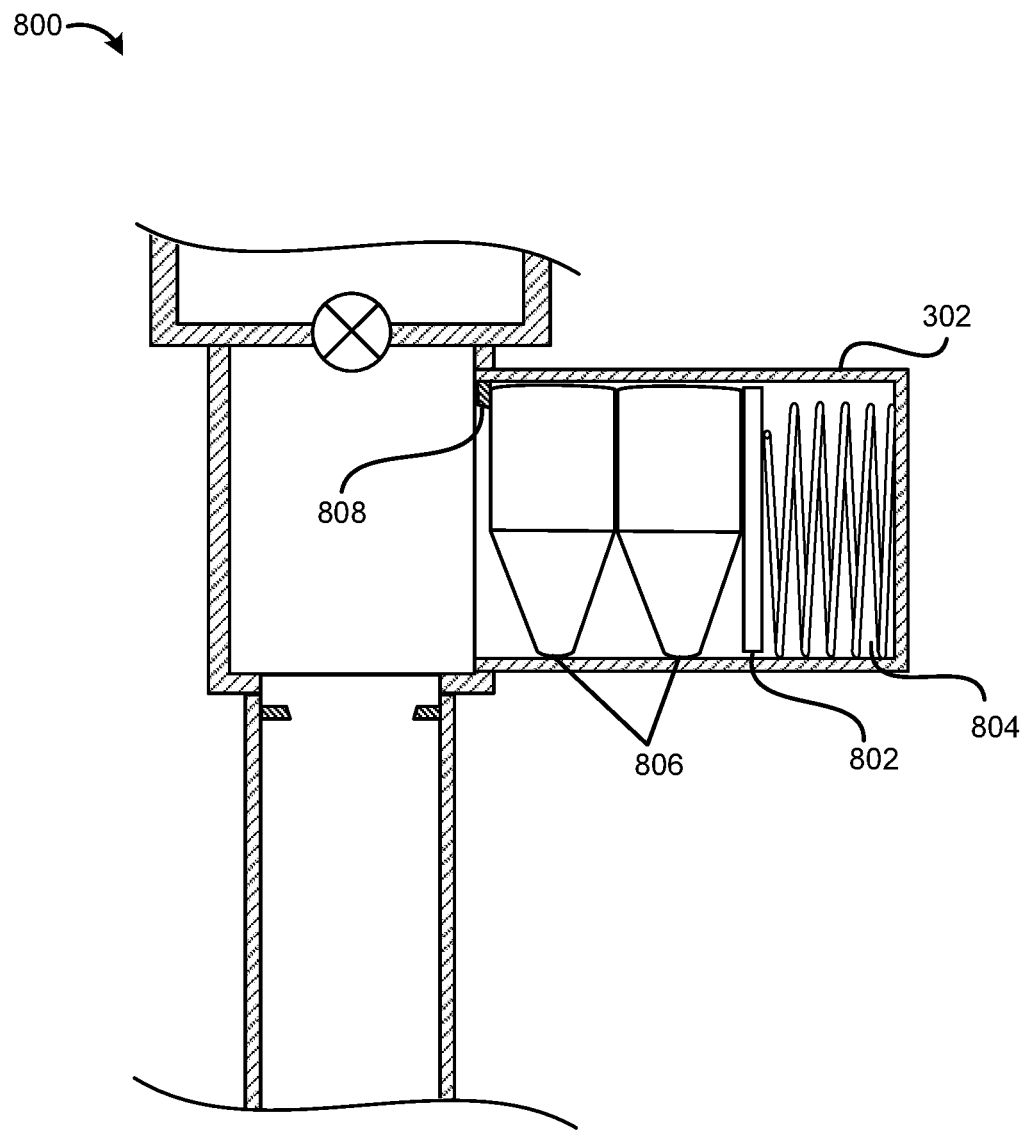
FIG. 8 illustrates a diagram of a chamber of a pod delivery apparatus with attached pod magazine, in accordance with an embodiment of the present invention.

FIG. 8 illustrates a diagram 800 of a chamber of a pod delivery apparatus with attached pod magazine, in accordance with an embodiment of the present invention. As shown in FIG. 8, a feeder 302 can include a box magazine. Although a box magazine is shown in the example of FIG. 8, as described above various different types of feeders may be used depending on application, pods, terrain, etc.

As shown in FIG. 8, feeder 302 can include a follower 802 connected to a spring 804. When pods 806 are inserted into feeder 302, the pods are pressed against follower 802 compressing spring 804. In some embodiments, feeder 302 can include a stop 808 to keep pods from feeding into the chamber prematurely. Stop 808 can be actuated when valve 410 is closed, enabling the next pod to be fed from feeder 302 after the previous pod has been fired.

Figure 9:
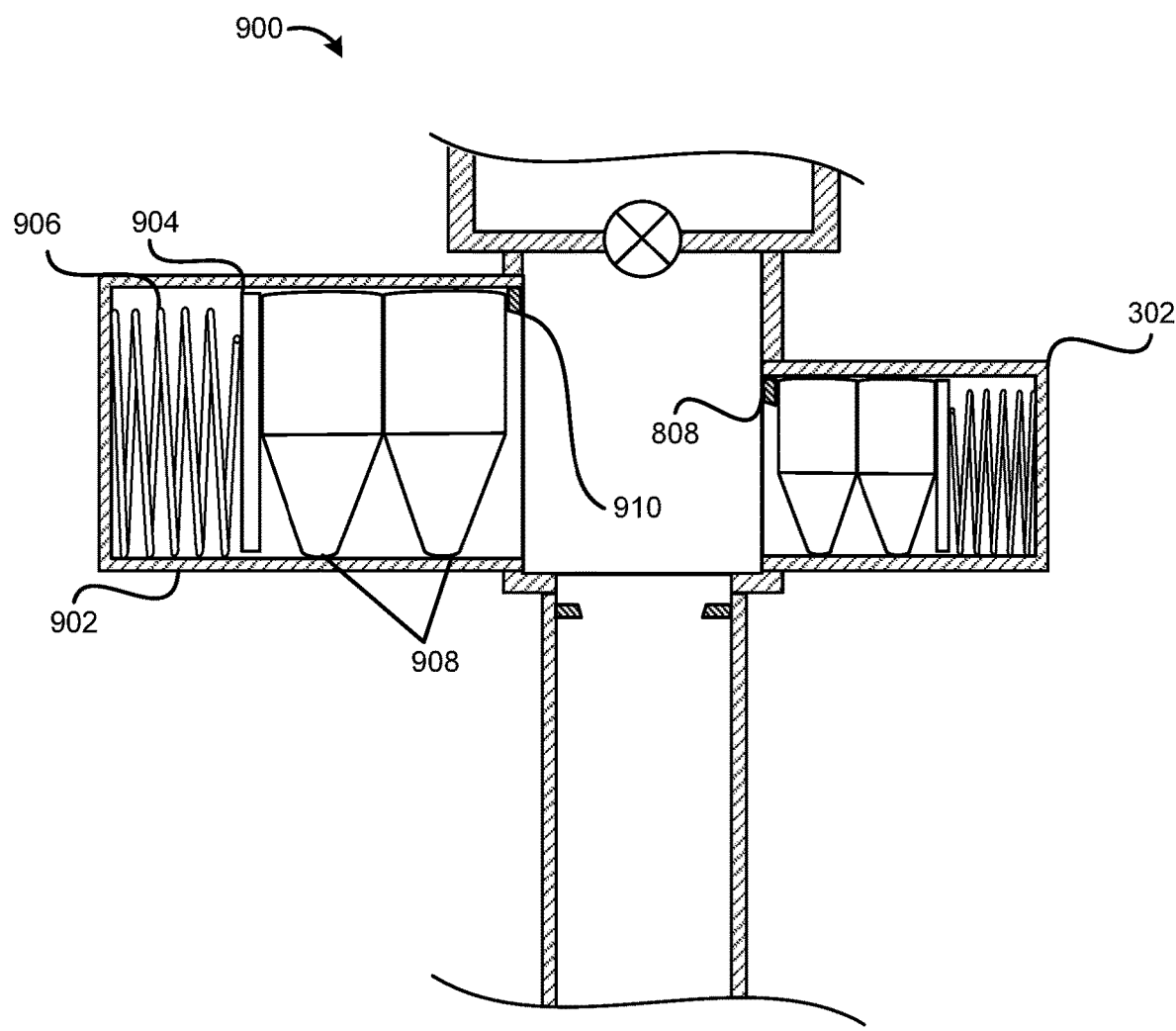
FIG. 9 illustrates a diagram of a chamber of a pod delivery apparatus with multiple attached pod magazines, in accordance with an embodiment of the present invention.

FIG. 9 illustrates a diagram 900 of a chamber of a pod delivery apparatus with multiple attached pod magazines, in accordance with an embodiment of the present invention. As shown in FIG. 9, multiple feeders 302 and 902 are attached to chamber 304. In this example, each feeder 302, 902 is a box magazine. Although a box magazine is shown in the example of FIG. 9, as described above various different types of feeders may be used depending on application, pods, terrain, etc. Multiple feeders enable a single mobile platform to carry different sized pods to be fired from the same pod delivery apparatus.

As shown in FIG. 9, feeder 302 can be substantially as shown in FIG. 7. A second feeder 902, which holds larger pods than feeder 302, can be connected to chamber 304 and can similarly include a follower 904 connected to a spring 906. When pods 908 are inserted into feeder 902, the pods are pressed against follower 904 compressing spring 906. In some embodiments, each feeder 302, 902 can include a stop 808, 910 to keep pods from feeding into the chamber prematurely and to manage feeding of pods between multiple feeders. Stops 708, 910 can be computer controlled, enabling pods to be fed selectively from either feeder 302 or 902 after the previous pod has been fired.

Figure 10A:
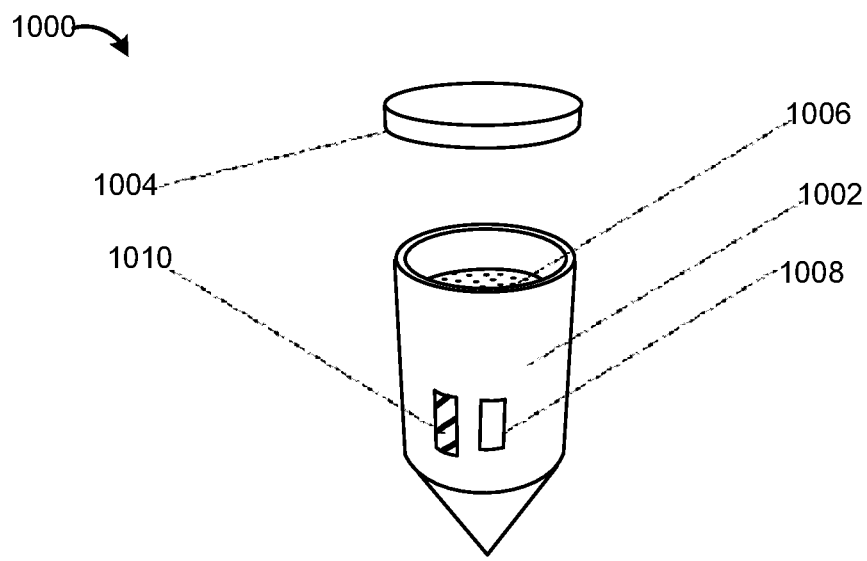
FIGS. 10A-10C illustrate examples of pods, in accordance with embodiments of the present invention.
Figure 10B:
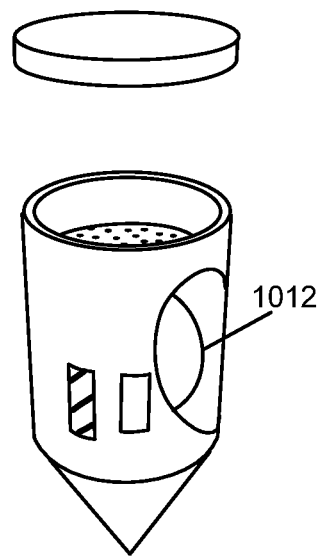
Figure 10C:
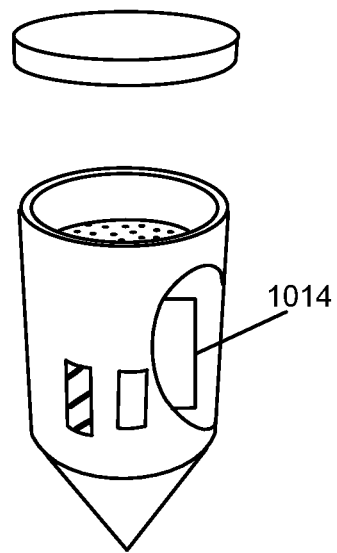

FIGS. 10A-10C illustrates examples 1000 of pods, in accordance with embodiments of the present invention. As shown in FIG. 10A, a pod can include a pod casing 1002, a pod lid/top 1004, a support matrix/gel 1006, a power supply 1008, and one or more sensors 1010. The support matrix/gel (also referred to herein as matrix material) can vary depending on the type of seed or payload included in the pod. The matrix material 1006 can include soil, nutrients, Pods may include various types of seeds, cuttings, or other plant material that may be sown. In some embodiments, the cap or lid may be designed to collapse or pierce upon firing, landing on or entering into the ground, so as to allow the seed to grow out of the pod immediately and allow water to enter.

Power supply 1008 can include a battery, solar panel, or other energy generation and/or storage unit. Power supply 1008 can provide energy to the one or more sensors 1010 incorporated into the pod. As discussed further below, power supply 1008 may also provide energy to one or more wireless communication devices incorporated into the pods. In some embodiments, the one or more embedded sensors 1010 can gather data relating to soil composition or seed, seedling, sapling, fungi, moss or protist health and growth data, as well as pod location, orientation, structural integrity, etc. The one or more sensors can communicate the sensor data to other pods, UAVs, base stations, and/or other communication devices for further analysis.

Additionally, as shown in FIGS. 10B and 10C, pods may include differently shaped compartments 1012, 1014 to include additional support matrix, gels, nutrients, etc. to support the payload at impact and to support the plant as it grows. Additional details are described with respect to FIGS. 11-24.

Figures 11A, 11B, 11C:
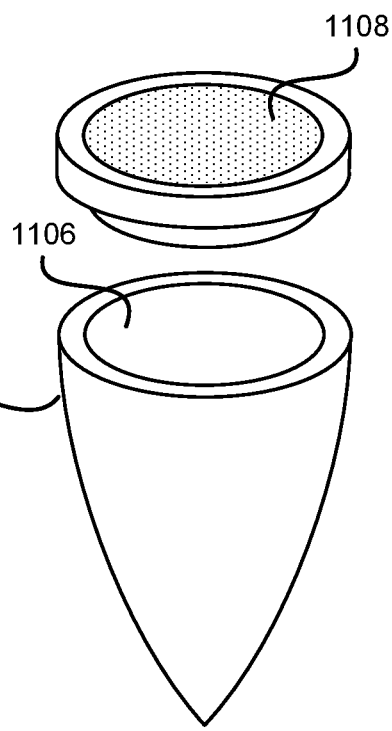
FIGS. 11A-11C illustrate components of a pod and lid, in accordance with embodiments of the present invention.

FIGS. 11A-11C illustrate components 1100 of a pod and lid, in accordance with embodiments of the present invention. As shown in FIG. 11, a pod can include various components, such as a lid 1102 and a casing 1104. Although the pods shown in FIG. 11 are substantially conical in shape, alternative shapes may also be used. Substantially conical can include rounded or otherwise curved-end pods, flat-nosed pods, and other substantially conical shapes. When the lid 1102 is fitted in place on the cap end 1101 of the casing, as shown in FIG. 11A, a cavity 1106 is formed in which seeds, nutrients, and other supporting material may be placed. Casing 1104 may be a hard or soft shelled casing. In some embodiments, casing 1104 may include nutrients such as nitrogen, phosphorous, potassium, calcium, sulfur, magnesium, and other plant nutrients and/or micronutrients. The nutrients included in the casing may be selected based on the species of plant included in the payload and/or based on nutrients present or absent from the planting environment. In some embodiments, different portions of the casing may include different nutrients, for example the penetrating end 1103 of the casing may include metals to improve the penetrating capability of the pod and to add micronutrients such as copper, iron and macronutrients such as magnesium, to the soil. The nutrients incorporated in casing 1104 the can be from natural biological sources, or from synthetic sources (mixed individual components). In some embodiments, casing materials can include biodegradable materials such as polyvinyl alcohol (PVA) or other water soluble polymers, UV light biodegradable materials, gelatin, resin, corn starch, sea shells, carbon fiber, graphene, ceramic, paper mache, or other materials.

In some embodiments, a pod may include a payload in cavity 1106. The payload can include planting material and matrix material. For example, planting material can include any of seeds, seedlings, saplings, and other plant matter. Matrix material may include any of fungi, bacteria, moss, protists, soil, and organic or inorganic substances such as fertilizer or gels used to encourage the growth of the seeds, seedlings, saplings, fungi, moss, protists and plants. In some embodiments, the payload may further include sensors, dyes, wireless communication devices, and other materials.

When a pod impacts the ground, significant forces can be transferred through the pod to the seed or payload, potentially damaging the payload. In some embodiments, casing 1104 can include fracture points designed to collapse upon impact of the pod with the ground. Such fracture points enable pods to break in predictable and repeatable ways, as well as absorb impact forces to protect the payload. In some embodiments, cavity 1106 can include internal structures (e.g., baffles) designed to restrict the movement of the payload. These said internal structures may be designed to collapse upon impact of the pod with the ground so as to absorb impact forces and protect the payload.

In some embodiments, pods may be assembled manually or automatically with various payload types. For example, pods may be assembled manually by filling the pod with seeds, loose/non-embedded sensors, etc. either by hand or with a hand-operated tool.

In some embodiments, as shown in FIGS. 11B and 11C, lid 1102 can include a perforated lid 1108 and a compartment 1110. In some embodiments, compartment 1110 can be filled with a location marking component such as paint, colored powder, or detectable substance which is opened upon firing or planting such that the location of the seed pod is marked on the ground. In some embodiments, different colored dyes can be associated with different species of plant. For example, a dye can include a chemical that reacts with chemicals in the soil at planting and/or with other components of the pod after planting to produce an observable frequency/reaction which can be monitored with an electromagnetic sensor (e.g., an infrared sensor, or visible sensor). Dyes can be selected to allow for either activation or deactivation by organisms or chemicals or physical properties of the soil or the ambient conditions. For example, dyes can be used to detect biological indicators associated with organisms both active and inactive. The dyes may react with proteins of the organisms or be metabolized by the organisms producing an indicator measurable by an electromagnetic sensor. In some embodiments, chemical dyes may be selected to identify various soil properties, such as pH, heavy metal content, carbon content, organic carbon content, nitrogen content, phosphorous content, etc.

FIGS. 12A-12C illustrate examples of pods 1200, in accordance with embodiments of the present invention. As shown in FIG. 12A, a pod can include an upper component 1202 and a lower component 1204. Upper component 1202 can include one or more stabilization components 1206. These components can improve stability in flight. Lower component 1204 can include a cap 1208 which includes a payload 1210. In some embodiments, as shown in FIG. 12A, cap 1206 can be contoured 1207 to improve stability in flight and can improve ground penetration upon planting. Although the contours in this example are in the shape of a screw or spiral, in some embodiments a dimple pattern or other contoured surfaces may be used. In some embodiments, as shown in FIG. 12B, cap 1206 can include a hardened tip 1212. The hardened tip 1212 can be made of biodegradable ceramic, metal, or other material. As shown in FIG. 12C, in some embodiments, a spherical pod may be used. The spherical pod can include two halves 1218, 1220 which when joined form a cavity in which a payload may be stored.

Figure 13:
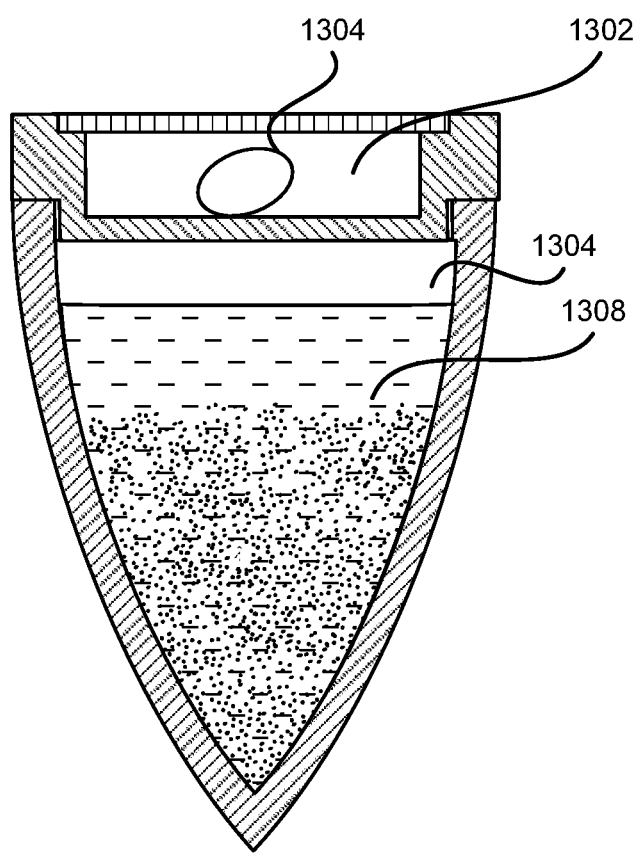
FIG. 13 illustrates an example of a dual compartment pod, in accordance with an embodiment of the present invention.

FIG. 13 illustrates an example 1300 of a dual compartment pod, in accordance with an embodiment of the present invention. In some embodiments, a pod may include multiple sub-compartments, such as a lid compartment 1302 and a body compartment 1304. The sub-compartments allow for pre-assembly of some components of the pod while others can be assembled later. For example, a seed 1306 can be prepackaged in a lid, and then a nutrient mixture 1310 can be added to body component 1304 prior to loading. This enables the nutrient mixture to be customized to a particular planting environment based on field data, reducing the time required from scouting to planting.

In some embodiments, sub-compartments can be separated by dividers that are designed to disintegrate under particular conditions (such as at impact, in the presence of water, etc.). This allows for nutrients to be released over time when conditions are right. The sub-compartments may be made of the same or different materials to the outer pod. For example, the casing and/or dividers may be designed to absorb direct linear force upon penetration and break on the rebound force. Additionally, or alternatively, the casing may absorb up to a set amount of force and then fail as designed. In some embodiments, stress loading can be short impulse or max force. In some embodiments, cross structures can be included in the pods (e.g., during manufacturing or during assembly) that restrict movement and focus forces in specific directions. For example, thin wall structures can be designed to absorb direct in line linear penetrating forces, and redirect them into the seed pod walls that collapse upon the pod landing on, or entering into, the ground so as to absorb impact forces and protect the payload. Casing and/or divider material can include mesh woven material. The thickness of the casing may vary (e.g., 0.1 mm to 20 mm) to accommodate smaller and larger pods and plant in different terrain conditions, withstand different firing forces, withstand different storage times, etc.

Figure 14A:
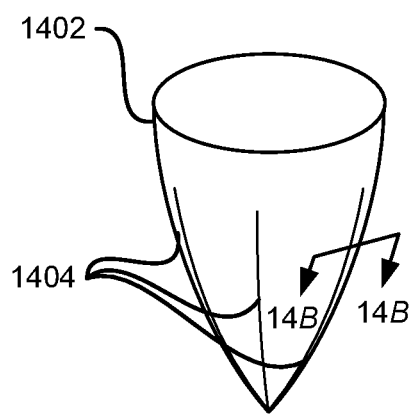
FIGS. 14A-14C illustrate an example of a break-away pod, in accordance with an embodiment of the present invention.
Figure 14B:
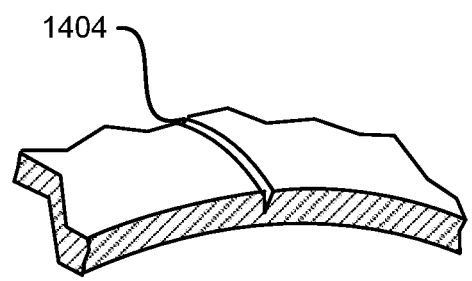
Figure 14C:
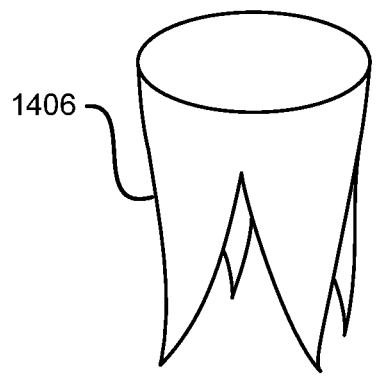

FIGS. 14A-14C illustrate an example of a break-away pod 1400, in accordance with an embodiment of the present invention. As shown in FIG. 14A, a pod 1402 as described above, can be manufactured to include specific weak points 1404. FIG. 14B shows a cross-section of pod 1402 at one of the weak points 1404, which in this example are notches 1404 in the casing. Although the weak points shown in FIG.

14 are lateral notches running the length of the pod casing, other designed weak points (e.g., gas pockets, perforations, etc.) can be introduced during manufacturing in the structure of the casing and/or dividers of a pod 1402. As shown in FIG. 14C, at impact the pod 1402 can fracture 1406 along the weak points 1404, absorbing energy from the impact, thereby protecting the payload, and exposing the payload to the planting surface.

FIGS. 15A and 15B illustrate examples 1500 of pod inner capsules, in accordance with embodiments of the present invention. A pod's payload can include one or more capsules. For example, as shown in FIG. 15A, one capsule 1502 can include nutrients and support materials 1504 and a second capsule 1506 can include a seed 1508 or other planting material. In some embodiments, as shown in FIG. 15B, a single capsule 1510 can include both the seed 1512 and the nutrients and support materials 1514. In some embodiments, each capsule can be made of gelatin or other material that quickly degrades in the presence of moisture. Although a single seed and associated capsules are shown in FIGS. 15A and 15B, each pod may include multiple seeds and associated capsules.

Figure 16:
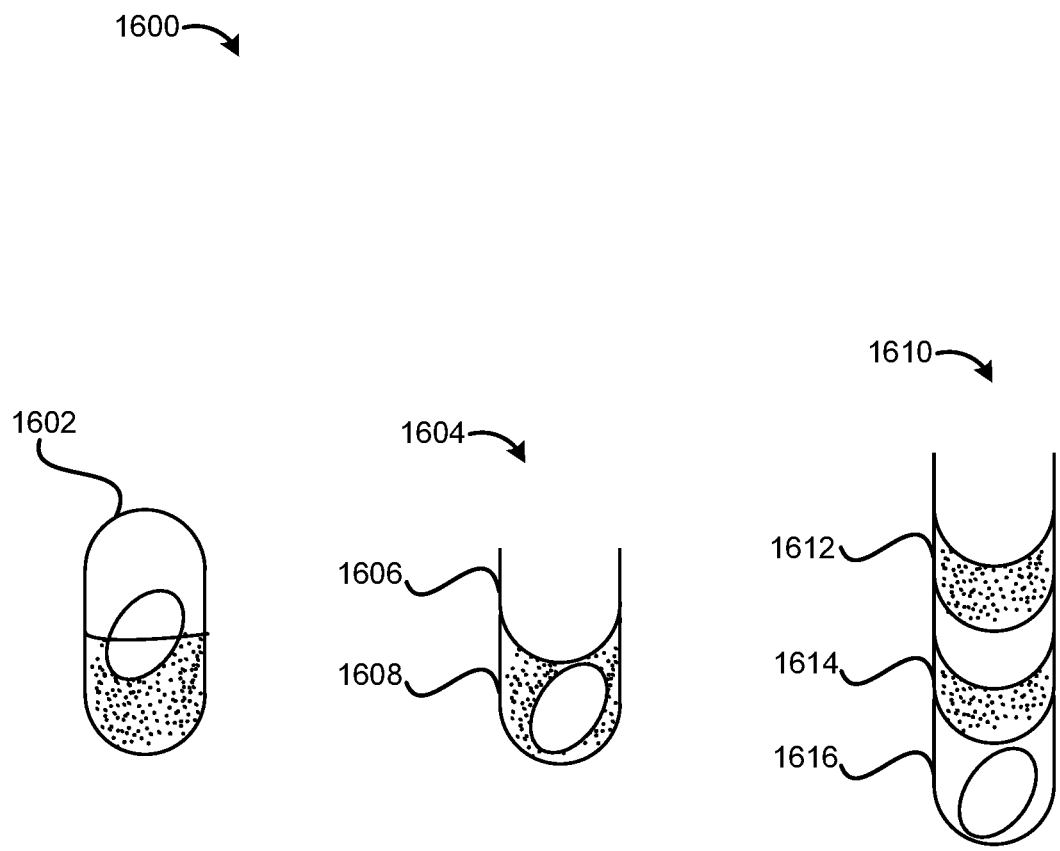
FIG. 16 illustrates examples of capsule pods, in accordance with an embodiment of the present invention.

FIG. 16 illustrates examples of capsule pods 1600, in accordance with an embodiment of the present invention. In some embodiments, pods can be made using capsules, such as gelatin capsules. These capsules quickly biodegrade and can include many different payloads, making them a simple and cost effective pod component. As shown in FIG. 16, a single capsule 1602 can be filled with a payload, including planting material and matrix material. In some embodiments, capsules can be stacked. For example, an open ended capsule 1604 can be formed by stacking two capsule halves 1606, 1608. This forms a multi-compartment pod, with the payload in compartment 1608. Capsules may be similarly stacked to form an arbitrarily large multi-compartment pod 1610. As shown, multi-compartment pod 1610 can include different payload materials in different compartments, such as matrix material in compartments 1612 and 1614, and planting material in compartment 1616. By stacking multiple capsules, the pod can be stabilized for flight. For example, compartment 1616 can be weighted, to keep it at the low point of the flight, and the added length of multiple capsules can improve stability in flight.

Figure 17A:
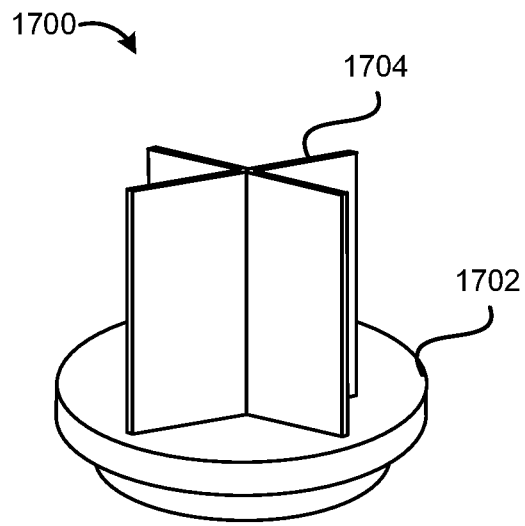
FIGS. 17A-17D illustrate examples of pod lid stabilization structures, in accordance with embodiments of the present invention.
Figure 17C:
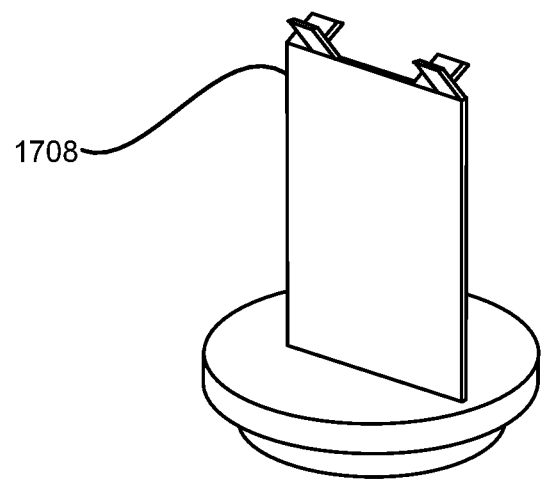
Figure 17B:
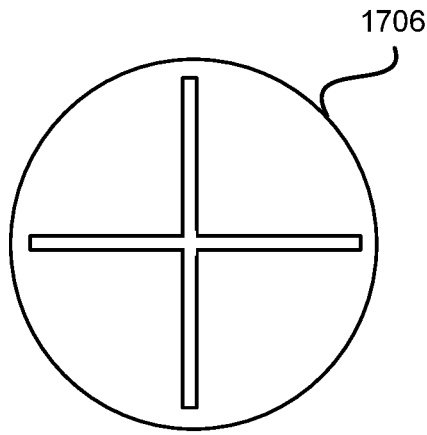
Figure 17D:
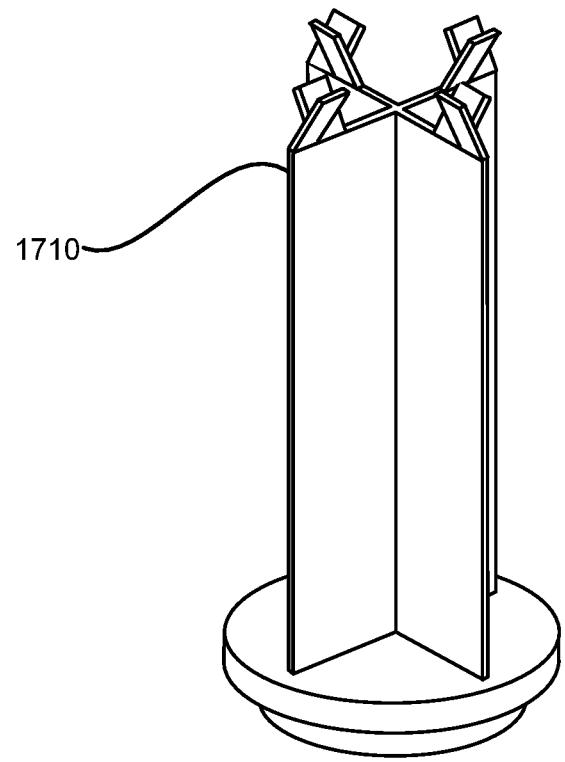

FIGS. 17A-17D illustrate examples 1700 of pod lid stabilization structures, in accordance with embodiments of the present invention. As shown in FIG. 17A, a lid 1702 can include a stabilization structure 1704. The stabilization structure can be designed to impart spin to the pod during descent. Depending on the size and weight of the pod, the length and orientation of the stabilization structure can vary. In some embodiments, the stabilization structure 1704 can be extended after firing. FIG. 17B shows a cross-sectional view 1706 of the stabilization structure. Different orientations of stabilization surfaces may also be used. For example, as shown in FIGS. 17C and 17D, additional stabilization surfaces 1708, 1710 can be added to the stabilization structure to improve the spin of the pod. In some embodiments, the stabilization structures can stabilize flight by ensuring a streamline path (i.e. resistance at the back so that the back remains behind the leading surface) and can work without causing the pod to spin.

Figure 18B:
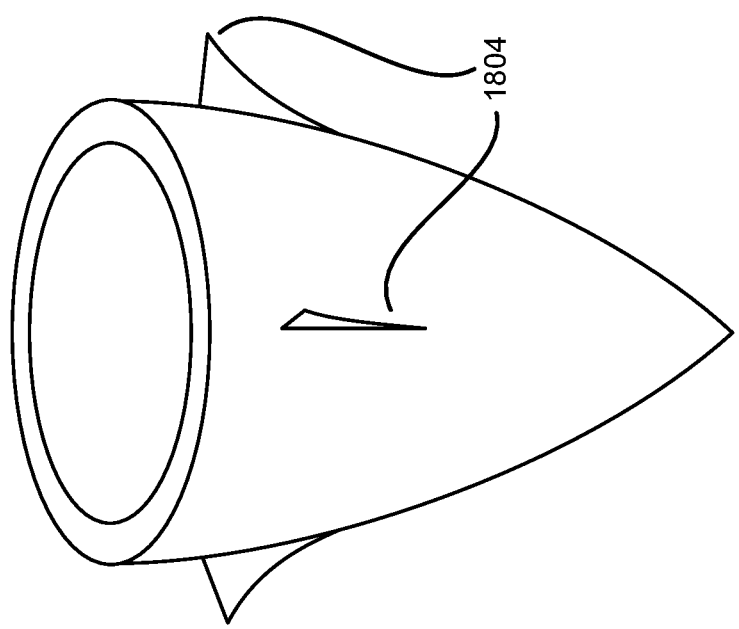
FIGS. 18A and 18B illustrate examples of pod stabilization structures, in accordance with embodiments of the present invention.
Figure 18A:
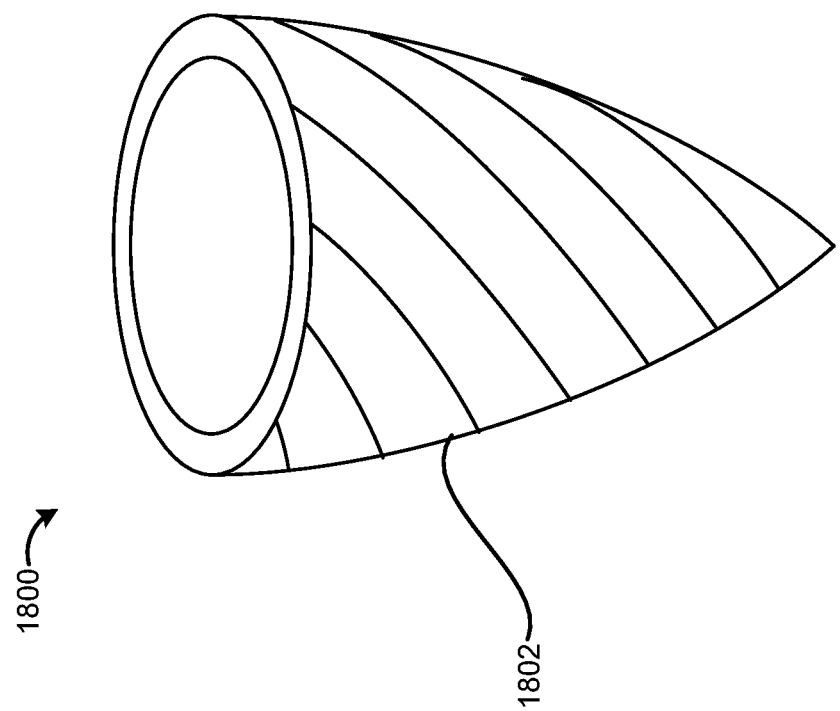

FIGS. 18A and 18B illustrate examples 1800 of pod stabilization structures, in accordance with embodiments of the present invention. In addition to stabilization features of the lid and the barrel, as described above, the casing of a pod may be modified to improve stability in flight. For example, as shown in FIG. 18A, the casing may be rifled 1802, causing the pod to spin as it is fired through a smooth bore barrel. The twist rate of the rifling 1802 may vary depending on the size and weight of the pod. In FIG. 18B, the pod casing has added stabilization surfaces 1804. These can be raised upon exit of the pod from the barrel or can be flexible enough to travel through the barrel without damage. This also allows a pod to be fired from a smooth bore barrel and stabilized in flight. Additionally, the rifling 1802 and stabilization surfaces 1804 can aerate the soil as the pod impacts the ground. In some embodiments, the casing may incorporate other stabilization features, such as contoured or dimpled surfaces to generate spin and stabilize pod flight.

FIGS. 19A-19C illustrates examples 1900 of gravity pods, in accordance with embodiments of the present invention. As described above, pods can be planted by propelling the pods out of a barrel from a mobile platform. However, a number of species of plants spread their seeds using wind and gravity. Embodiments of the present invention can mimic this behavior using specialized gravity pods. These gravity pods can be dropped from the mobile platform without requiring additional propellant. As shown in FIG. 19A, one example of a gravity pod includes wings 1902 mounted to the top of a pod 1904 which includes a payload 1906. The design of the wings and the pod can be based on naturally occurring seeds, such as samaras. The wings impart spin to the pod 1904 as it descends, stabilizing flight and making the planting location more predictable.

FIGS. 19B and 19C show alternative embodiments of gravity pods. A wing 1908 can be attached to a pod 1910. The wing can be attached using a plug 1912 or other connection. In the embodiment shown in FIGS. 19B and 19C, wing 1908 functions as a lid for pod 1910, sealing the opening of the chamber in pod 1910. Upon landing, the wing can fall off or biodegrade, opening the plug and allowing moisture and/or light to enter the pod and/or enable the growing plant to escape. As shown, the pod 1910 can include one or more seeds 1914 and nutrient and/or soil mixture 1916. In some embodiments, a stabilization surface 1918 can be added to the bottom of the pod. This surface can add stability to the flight of the pod as well as break up soil upon impact.

Figure 20A:
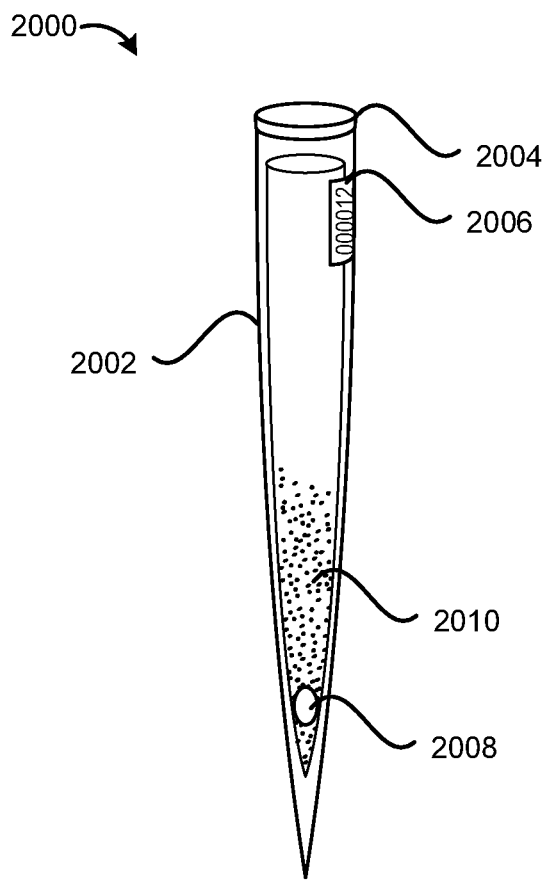
FIGS. 20A-20D illustrate examples of spear pods, in accordance with embodiments of the present invention.
Figure 20B:
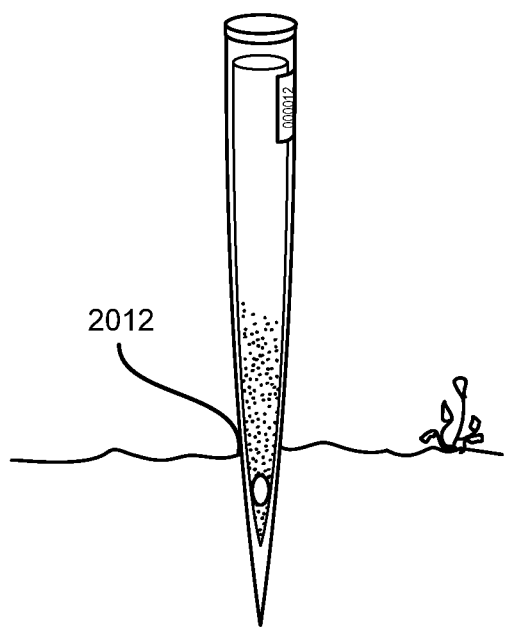

FIGS. 20A-20D illustrate examples 2000 of spear pods, in accordance with embodiments of the present invention. As shown in FIG. 20A, a spear pod 2002 can act as a marker stake in addition to delivering a payload. Spear pod 2002 can include a lid 2004, an identifier panel 2006. Within spear pod 2002, as in other pods as described above, the payload can include one or more seeds 2008 and a nutrient/soil matrix 2010. As shown in FIG. 13B, spear pod 2002 can penetrate the ground 2012 and remain upright. In some embodiments, sensors in the pod can detect and transmit the orientation, penetration depth, and other planting characteristics.

Figure 20C:
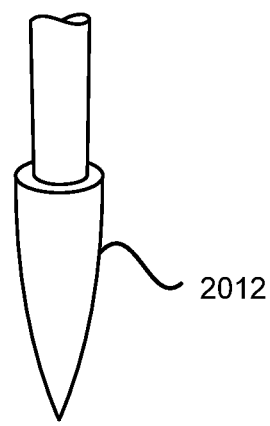
Figure 20D:
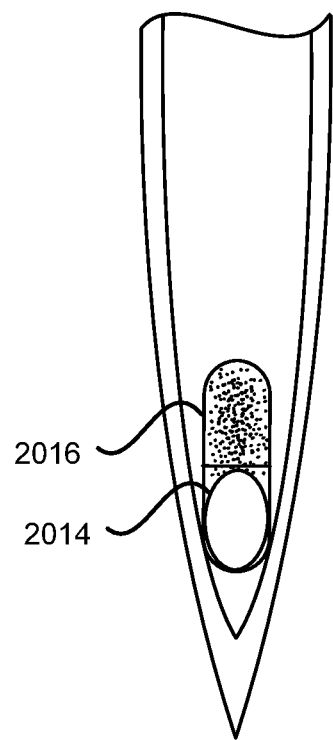

In some embodiments, a spear pod can include a hardened and/or weighted cap 2014, as shown in FIG. 20C. The cap 2014 can aid in ground penetration in dense soils or difficult terrain. As shown in FIG. 20D, in some embodiments, the seed and nutrient/soil matrix can be included in a capsule.

Figure 21A:
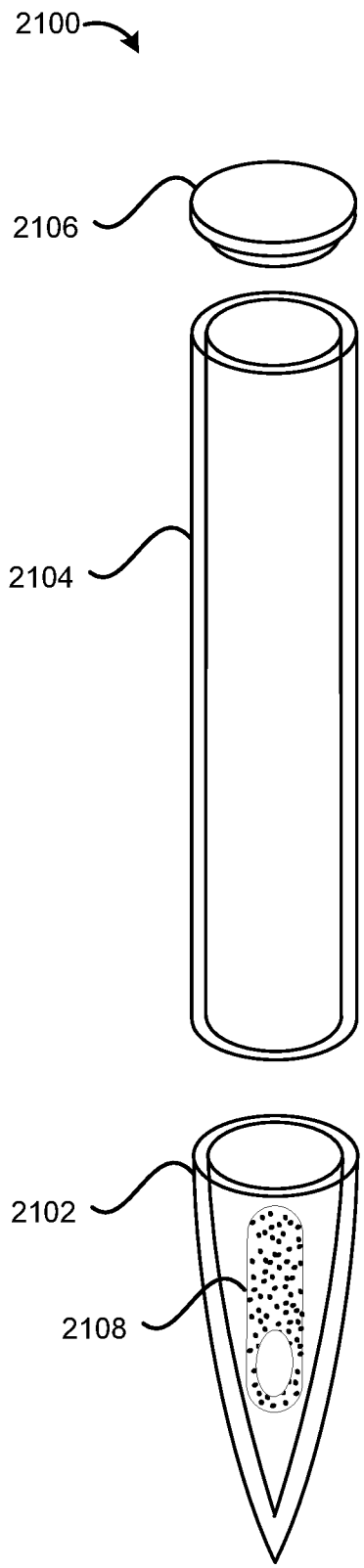
FIGS. 21A-21C illustrate an example of a multi-component spear pod, in accordance with embodiments of the present invention.
Figure 21B:
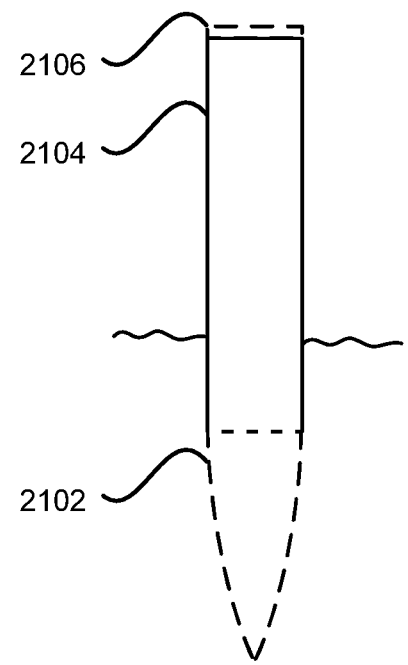
Figure 21C:
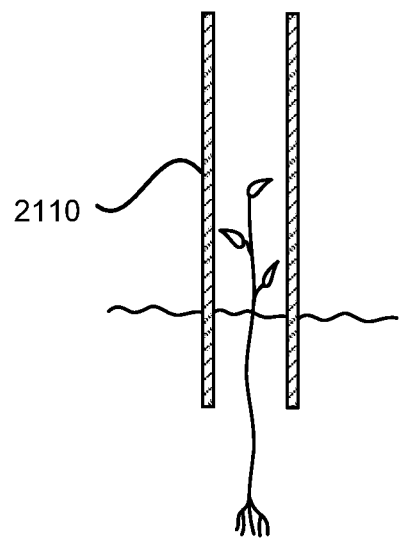

FIGS. 21A-21C illustrate an example 2100 of a multi-component spear pod, in accordance with embodiments of the present invention. As described above with respect to FIGS. 20A-20C, a spear pod can deliver a payload while also serving as a marker stake. As shown in FIG. 21A, a spear pod can be designed with multiple components that each serve different purposes during the development of the plant. For example, a spear pod can include a base pod 2102 which includes the seed and soil/nutrient matrix 2104. As shown in FIG. 21A, the seed and soil/nutrient matrix may be included in a capsule, however in some embodiments, they may be loose within base pod 2102.

The spear pod may also include a protective component 2104. Protective component 2104 can be a hollow tube which serves as a visual marker and also protects the growing plant. For example, as shown in FIG. 21B, once planted the lid 2106 and base 2102 may begin to biodegrade, opening the spear pod to air and precipitation as well as exposing the newly growing plant to the surrounding soil. As shown in FIG. 21C, the middle protector component can remain in place 2110, protecting the newly growing plant from predation and providing structural support as it grows.

Figure 22A:
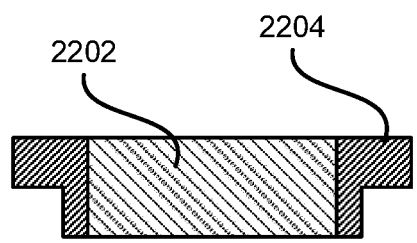
FIGS. 22A-22E illustrate examples of pod lids, in accordance with embodiments of the present invention.

FIGS. 22A-22E illustrate examples 2200 of pod lids, in accordance with embodiments of the present invention. Lids are useful for packaging pods and keeping their contents in place prior to planting. However, once planted, the lids can be an impediment to getting sufficient light and moisture to the planted seed. In some embodiments, the lid can be designed to overcome these issues. For example, as shown in FIG. 22A, a lid can include a biodegradable plug 2202. The material used in plug 2202 can be selected based on how quickly the plug needs to biodegrade. The lid can also include a structural portion 2204 made of a slowly biodegrading material. This provides structural rigidity to the lid and/or pod.

Figure 22B:
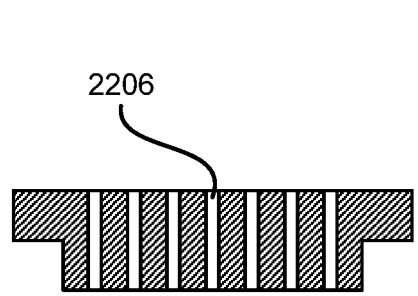
Figure 22C:
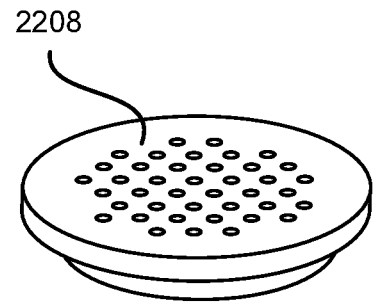
Figure 22D:
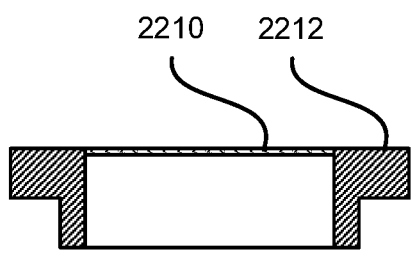
Figure 22E:
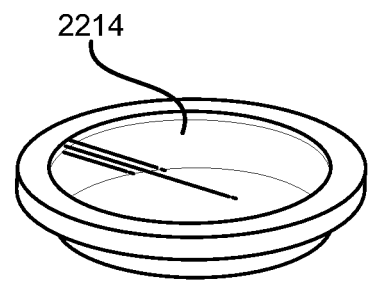

In some embodiments, as shown in FIGS. 22B and 22C, the lid can be perforated 2206, 2208. The perforations allow for moisture to penetrate the lid. This can accelerate biodegradation and can also be used to more closely time the biodegration process to environmental conditions. For example, it may be useful to keep the lid largely intact until the rainy season starts. When the rains begin, the perforated lid quickly biodegrades, exposing the seed to the elements. Similarly, as shown in FIGS. 22D and 22E, a lid can include a thin film 2210 spread across a structural portion 2212. The thin film can be transparent or translucent 2214, allowing light to reach the interior of the pod. The thin film and the structural portion may biodegrade at different rates, as in the example described above with respect to FIG. 22A.

FIGS. 23A and 23B illustrate an example 2300 of an impact-actuated lid, in accordance with embodiments of the present invention. As shown in FIG. 23A, a lid 2302 can be connected to a pushrod 2304. The pushrod can extend from the lid, through the pod, and out the bottom of the pod. The pod as depicted in FIG. 23A is as it is loaded, or in flight, with the lid closed and the pushrod extending from the bottom of the pod. In FIG. 23B, the pod has been planted. The force of impact is incident on the pushrod 2304, forcing the lid 2302 into an open position 2306. This action also absorbs impact energy and directs it to opening the pod, protecting the payload. Once open, moisture and light can reach the payload inside.

Figure 24A:
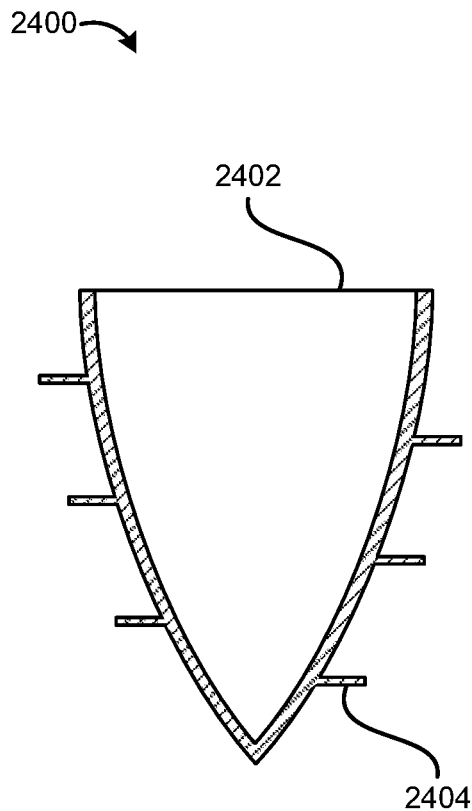
FIGS. 24A-24C illustrate examples of specialized pods, in accordance with embodiments of the present invention.
Figure 24B:
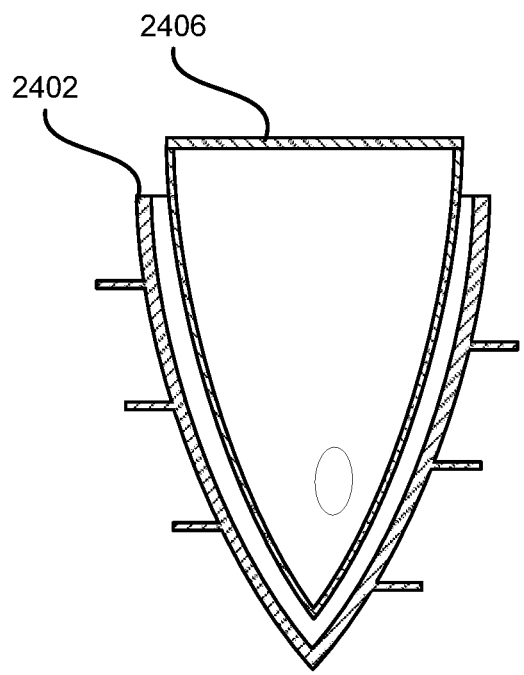
Figure 24C:
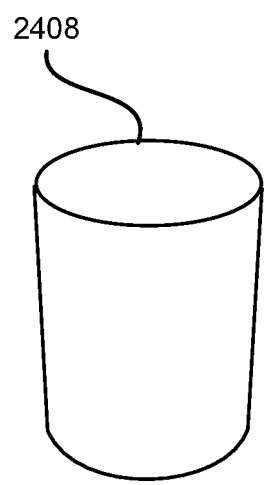

FIGS. 24A-24C illustrate examples 2400 of specialized pods, in accordance with embodiments of the present invention. In some embodiments, specialized pods may be used in different terrain conditions. As shown in FIG. 24A, one specialized pod 2402 can be used to break up and aerate the soil prior to planting. For example, pod 2402 can be weighted to improve penetration and may include aeration surfaces 2404 loosen the ground upon impact. As in planter pods described above, stabilization features, such as stabilization surfaces, dimpling, rifling, etc. may also be used to impart spin to pod 2402, improving aeration at impact. In some embodiments, pod 2402 can include nutrients, water, or other planting material which is added to the ground as it is aerated.

As shown in FIG. 24B, in some embodiments, a planting pod 2406 can be inserted into pod 2402. At impact, pod 2402 can loosen the soil and planting pod 2406 can add its payload to the loosened soil. In some embodiments, a layer of nutrients, gel, or other material can be used to join pod 2402 and pod 2406. After planting, as the pods biodegrade the nutrient layer can be introduced to the surrounding soil. As shown in FIG. 24C, in some embodiments, a pusher pod 2408 can be used to push a previously planted pod into the ground further and to break the previously planted pod. Pusher pods 2408 can be sized to have the same or greater diameter as the pod being pushed. The pusher pods can be added to the feeder such that the planting pod and pusher pod alternate in firing order. At each planting, the planting pod and pusher pod can be fired in rapid succession, such that the pusher pod impacts the planting pod just after planting.

In some embodiments, sensors on each planting pod can indicate a planting depth. For those planting pods that have been planted, but have not been planted at a predetermined depth, a message can be sent from pod to pod through a pod communication system to request a pusher pod. A second mobile transport platform can be dispatched to the pod location and fire a pusher pod at the pod location. In some embodiments, the second mobile transport platform can be a land-based platform. As described above, in some embodiments, pods may be adapted for each species used. For example, different sized pods may be used for different sized seeds.

Figure 25:
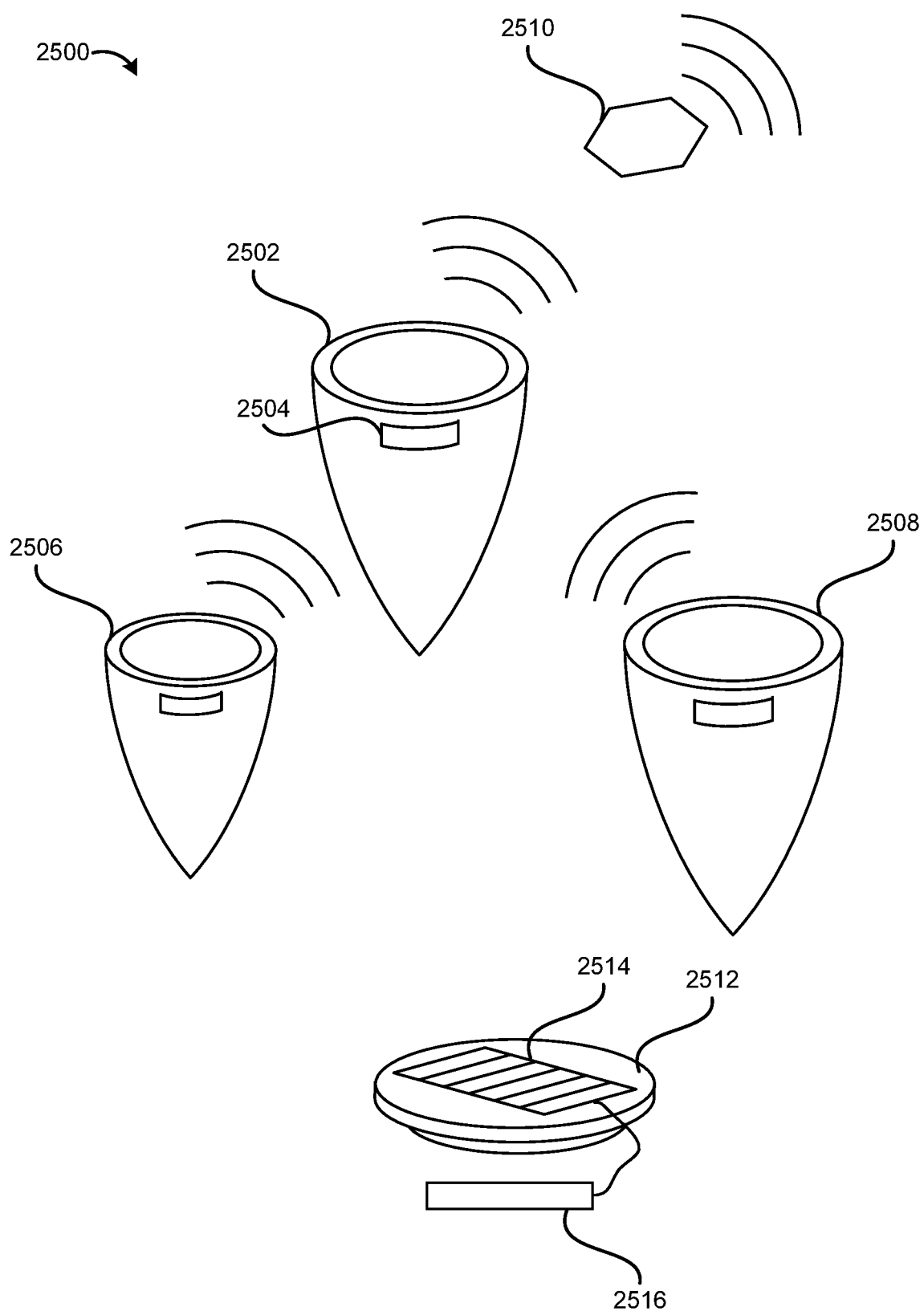
FIG. 25 illustrates an example of a pod communication system, in accordance with an embodiment of the present invention.

FIG. 25 illustrates an example of a pod communication system 2500, in accordance with an embodiment of the present invention. As shown in FIG. 25, in some embodiments a pod 2502 can include various sensors 2504. In some embodiments, sensors 2504 can include sensors that detect temperature, moisture level, pH, CO2, Oxygen, light level, organic & inorganic molecules, organic carbon, and other nutrients. In some embodiments, sensors 2504 can include a wireless communication module, such as a wireless transmitter, configured to communicate with other pods 2504, 2506, base stations or specialized transmitter pods 2508, and/or mobile transport platforms. In some embodiments, specialized transmitter pods, including additional power supplies and improved transmission range can be planted in the same area as planting pods. The planting pods 2502, 2504, 2506 can form a mesh network with transmitter pod 2508. Transmitter pods can be designed so as to not fully penetrate, remaining exposed with solar panel or other energy generation system so as to enable transmission of signals. For example, transmitter pod 2508 can include a specialized lid 2510 including an energy capture device 2512 (e.g., solar panel, solar paint, or other energy capture system) connected to a battery or other energy storage system.

In some embodiments, pods can communicate over a mobile network, such as a GSM network. pods can report back on status of immediate pod microclimate directly after firing (moisture, sunlight, temperature, pH, seismic activity) using GSM. In some embodiments, the pod communication system can be a multi-pod network where the majority of pods can transmit their information to another pod where the other pod can either 1) transmit again to another pod or 2) transmit to a pod which has the capability of sending information to a non-pod device to send information out of the pod network. In some embodiments, not every pod needs to carry a mobile network module, instead a subset of pods (e.g., SubPods) can carry a smaller module (e.g., a 400 MHz radio transmitter), while another subset of pods (e.g., CentralPods) can carry a larger mobile network (e.g., GSM) module. The mobile network module can be used to connect to an existing mobile network, or to connect to an aerial communication device, such as a UAV. In some embodiments, a CentralPod can be positioned near the middle of the pod collection. The CentralPod can collect information from surrounding SubPods. A mesh network can be used with each pod to include processing power onboard and broadcast the information of multiple pods when the information is collected.

In some embodiments, one or more ground control pod can be planted at known geographic locations. The geographic location can be determined using satellite navigation techniques, such as RTK GPS, and absolute height measurements so that the ground control pods can be used as a ground control point for future mapping flights. The ground control pod can be planted so that it is visually or electromagnetically identifiable. For example, the ground control pod can be fired to penetrate into the ground with a lid that remains above the ground to be visually identifiable from the air. Alternatively, or additionally, the ground control pod can transmit a signal to a UAV flying near it for identification. As described above, the pods can be powered by a solar panel on the lid. The marker on the lid can be identified by color (visual, luminescent, fluorescent), number, letter, pattern. In the case of fluorescence, a laser can be used to illuminate a large area to excite the material at a pre-determined frequency rather than simply using ambient solar illumination. In some embodiments, the pods can be identified by their orientation for example planted in a square or circle orientation.

Figure 26:
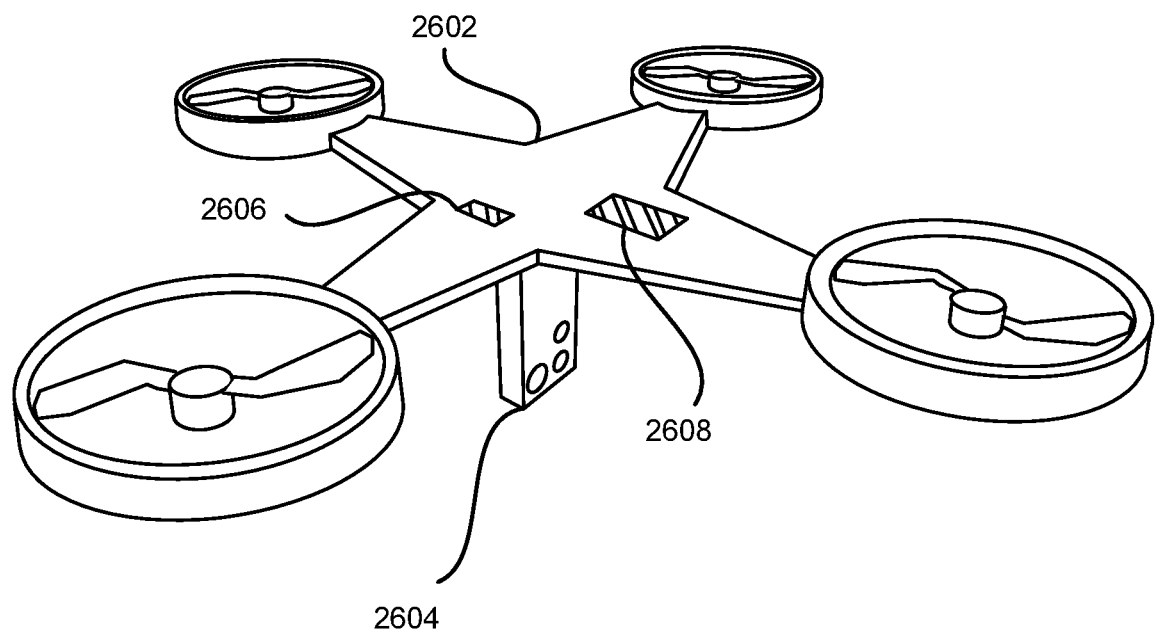
FIG. 26 illustrates an example of a mapping system, in accordance with an embodiment of the present invention.

FIG. 26 illustrates an example of a mapping system 2600, in accordance with an embodiment of the present invention. As shown in FIG. 26, mapping system 2600 can be implemented as a UAV 2602. In some embodiments, mapping system 2600 can be implemented in any mobile platform, including aerial mobile platforms, satellite platforms, and land-based mobile platforms. Mapping system 2600 can include various sensors to gather data describing the surrounding area that can be used to create a map of local land characteristics. In some embodiments, sensors 264 can include electromagnetic sensors such as visual, multispectral, hyperspectral, radar, LiDAR, and infrared sensors. In some embodiments, mapping system 2600 can include one or more wireless communication modules including GPS or other wireless tracking data, GSM or other mobile networking module. In some embodiments, current, historic and predicted weather data can be received on a dedicated weather communications device. In some embodiments, mapping system 2600 can include a power supply 2608 which can include a battery, solar panel, or other energy generation and/or storage unit.

In some embodiments, data from mapping system 2600 can be processed to create maps for validation of satellite data sets, forest and crop health monitoring, soil composition analysis, generation of one or more seed pod planting patterns, and/or two and three dimensional mapping of land. In some embodiments, health monitoring maps can include ecological assessments such as carbon quantification, tree counts and crop quantification, tree and crop disease monitoring (e.g., leaf cover, color change, identification, etc.), and microclimate data. In some embodiments, area maps can be generated that show topological detail, soil characteristics (e.g., identification of rock, water, soil, stumps and additionally assessment of moisture content, soil nutrients, and other compounds), identification of debris (e.g., branches, stumps, roots, offcuts, and forestry equipment debris), etc.

Using the maps generated from the data collected by mapping system 2600, a planting pattern and planting sequence can be generated. The planting pattern and planting sequence (also referred to herein as "planting pattern") can identify planting locations, planting angles, optimized sequence of planting, tree species appropriateness and selection, pod size, and/or planting speed.

Figure 27:
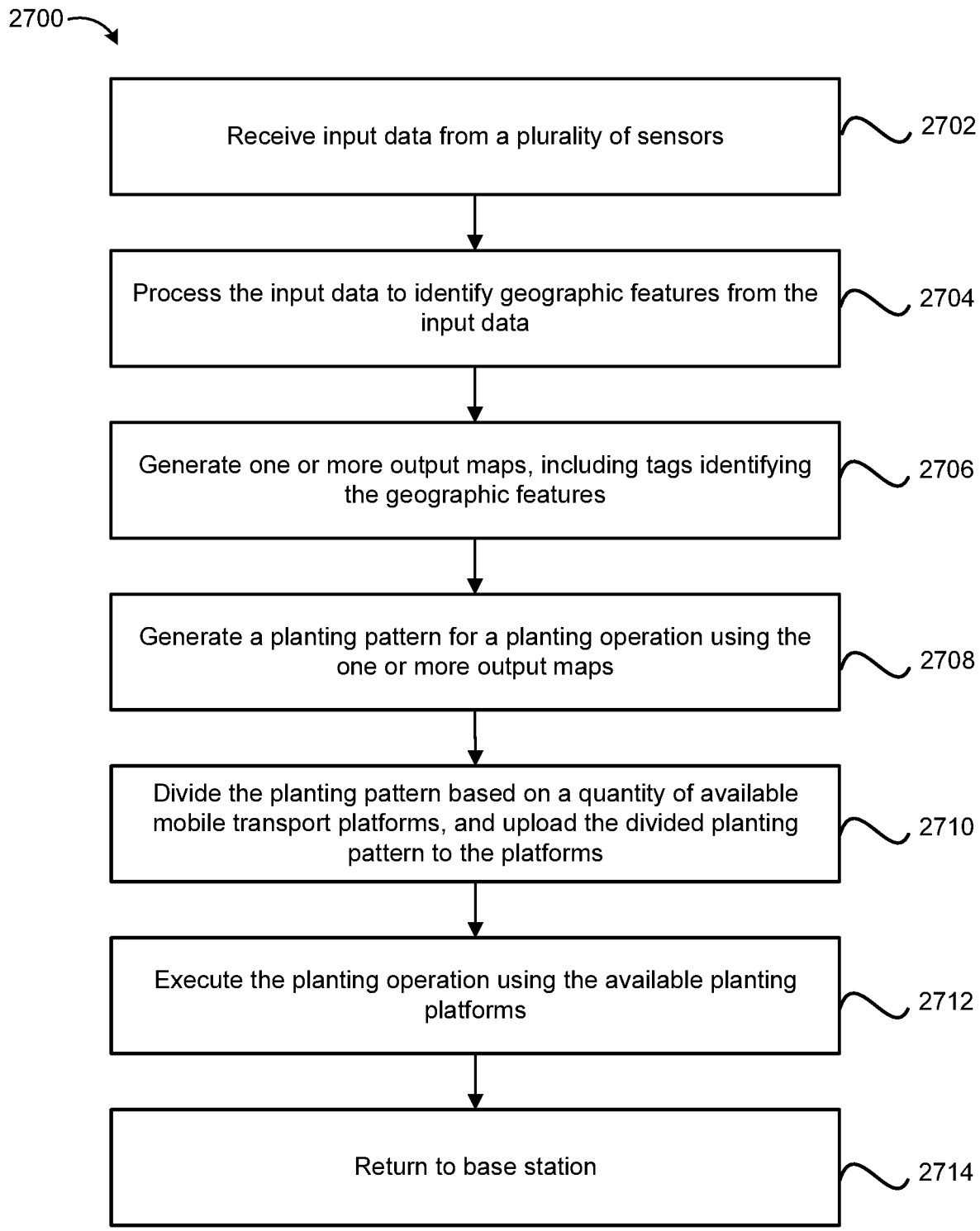
FIG. 27 illustrates a block diagram of a method of automated planting, in accordance with an embodiment of the present invention.

FIG. 27 illustrates a block diagram of a method 2700 of automated planting, in accordance with an embodiment of the present invention. At 2702, data from various sensors can be received. As described above, mapping system 2000 can include various sensors, such as electromagnetic sensors such as visual, multispectral, hyperspectral, radar, LiDAR, and infrared sensors. The sensory input data can be collected before, during and after planting. The sensor data can be processed at 2704 to determine information from the raw data. For example, in some embodiments, the processing can include calculating topology both of the base land and the height of any structures or plants and applying indices to the data, for example NDVI, TCARI/OSAVI, biomass content, nitrogen content, etc. Processing may further include auto tagging features identified from the sensory input data, for example: man-made structures, rocks, water, soil, plants (e.g., trees, bushes and grasses), debris (e.g., stumps, logs, branches), and other features. Second order algorithms can be applied to determine soil type, soil pH, soil relative humidity, etc.

At 2706 the processed data can be used to generate output maps. The output maps can include a combination of various map layers for both human observation and computational assessment. The output maps can be used to generate a precision planting pattern and monitoring planting success, but can also be used for: assessing forest health including ecological assessments (carbon counts, tree counts, tree diseases, weeds, leaf cover, color change (e.g., red-shift), etc.) and microclimate analysis (localized temperature and humidity measurements, etc.). In some embodiments, the output maps can be used to validate satellite based data sets e.g., available from satellite services. The mapping done after planting used to monitor planting success is also used to optimize the precision planting pattern.

Figure 28:
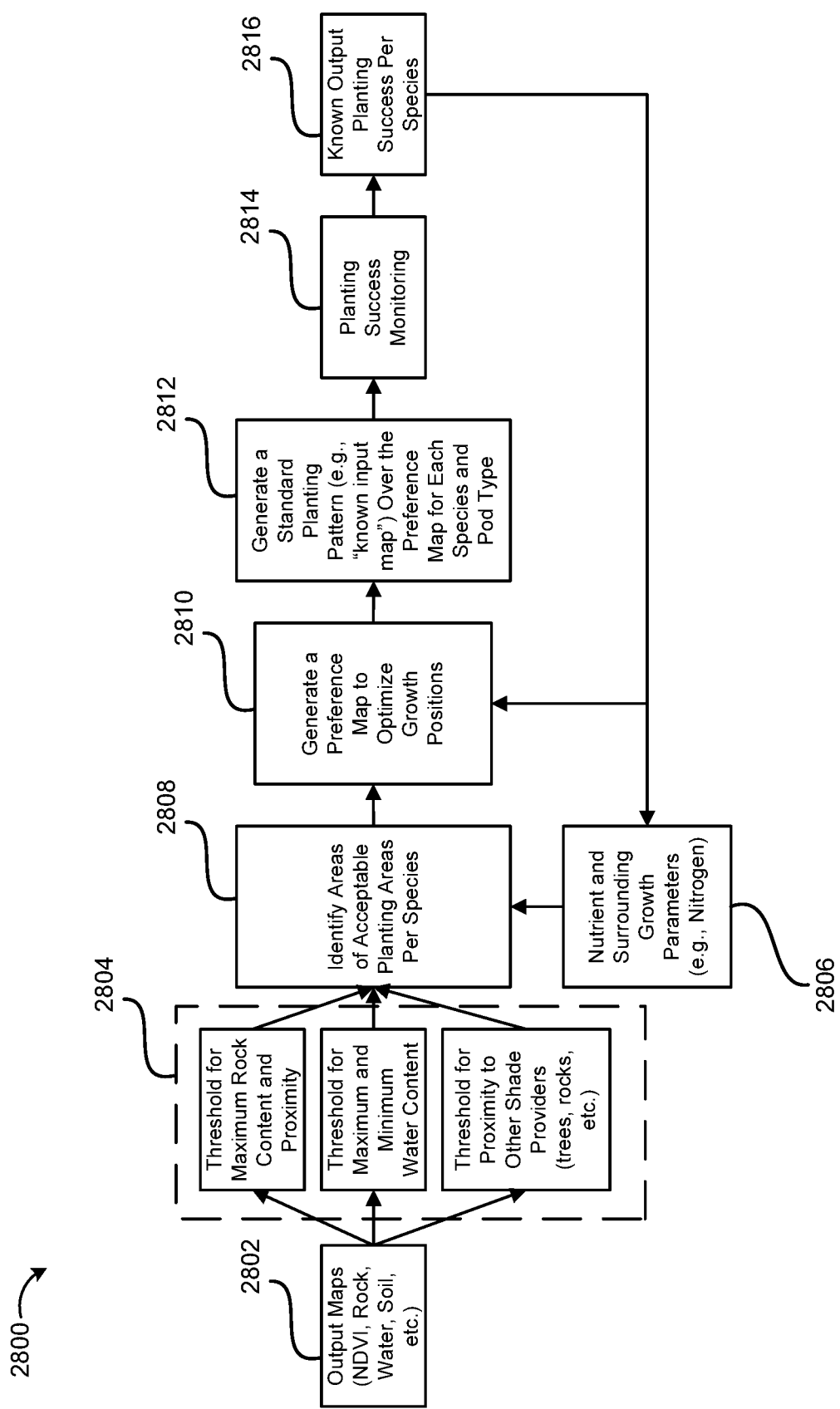
FIG. 28 illustrates a block diagram of a method of map generation, in accordance with an embodiment of the present invention.
Figure 29:
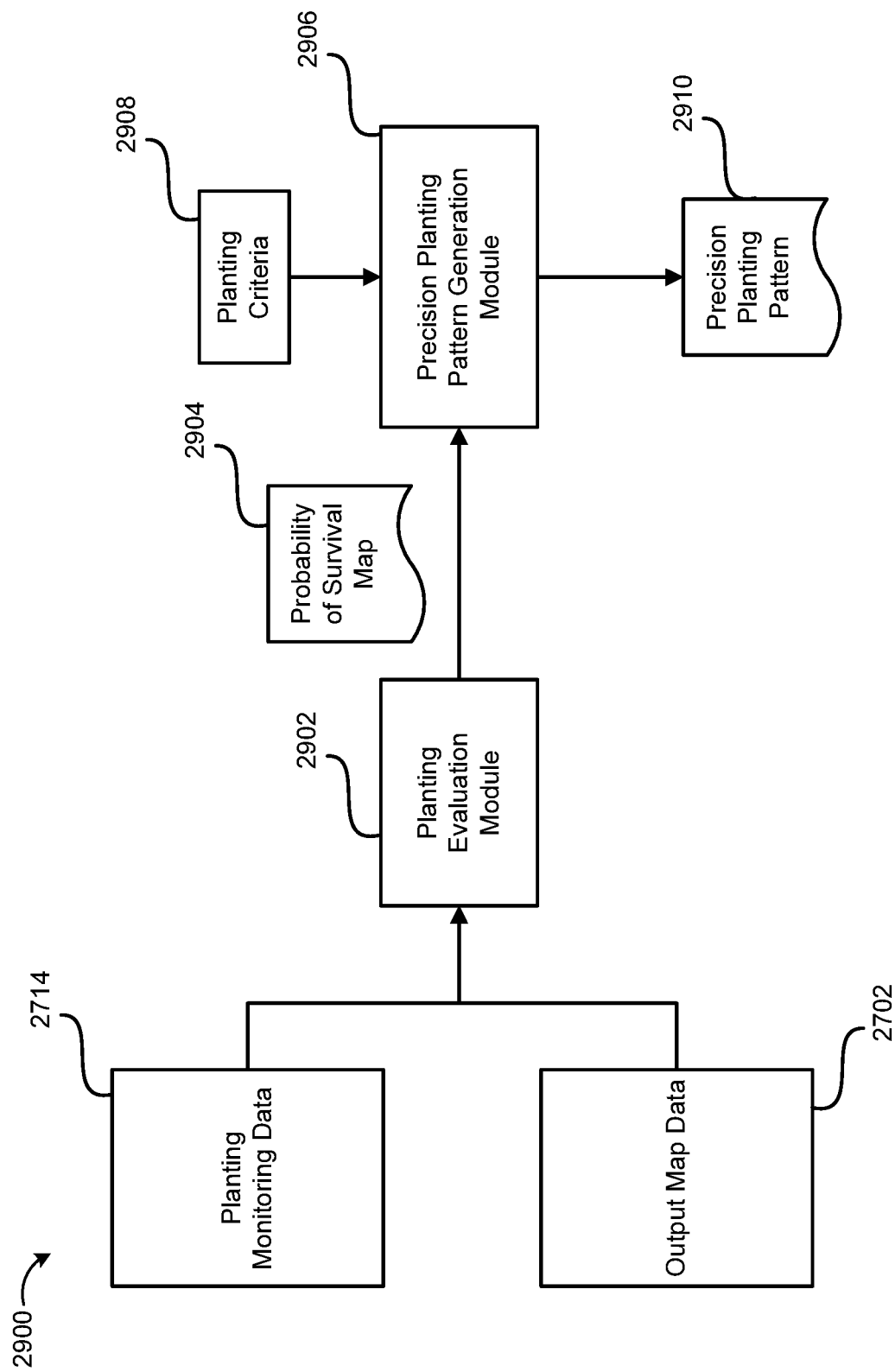
FIG. 29 illustrates a block diagram of a method of determining planting patterns, in accordance with an embodiment of the present invention.

At 2708, the output maps can be used to generate a precision planting pattern, as shown in FIGS. 28 and 29. In some embodiments, the precision planting pattern can include the geographical location of each planting location (e.g., taking into consideration planting density and distribution), which plant type (e.g., species or plant growth stage) is planted at each location (because different species or plants at different stages require different conditions on the ground to optimize growth), which pod type is planted in each location, the angle each pod is planted at, the timing of each pod planting, whether pre- and post-pod treatment is used, local identifying features associated with each individual planting point used for re-targeting of the planting drone.

At 2710, the planting pattern can be uploaded to the mobile transport platform. In some embodiments, the planting pattern is divided into multiple available platforms (e.g., UAVs, or other platforms). The order of planting for each platform can be optimized for flight time, finishing the planting mission near a base station to decrease non-planting flight time, carrying capability per platform to maximize the number of pods planted per mission, battery consumption per flight taking into consideration the altitude changes, etc. The planting pattern and order of planting for each platform is uploaded to each platform. The geographical location of the initial bases station and final base station (i.e. where to take off and land) can be uploaded to each platform. This upload can then be updated mid-flight if the final base station position changes. The home point (emergency land point) is set and uploaded.

At 2712, the planting operation is executed by the mobile transport platforms, this may include the actual planting of the pods. Additional data inputs include soil density and calibrated required pressure for firing mechanism. This way, the firing mechanism can optimize pod penetration for soil types in a region. This calibration is according to each species type which may require different planting depths. Planting operations can involve target acquisition and control, such as using real time data to confirm planting location before planting (e.g., that no major changes to the planting area have occurred). As described above, a number of safety checks may also be performed prior to each planting, such as reviewing thermo-imaging data of the target to ensure no animal or person is blocking the target. Operations may also include navigation, such as planting the pods at the pre-determined planting location based on the precision planting pattern, and using real time data to conduct obstacle avoidance during the flight mission e.g., avoiding fallen trees that can obstruct the flight path. Sensors on the platform can detect obstacles (e.g. fallen trees, logs, branches, new artificial obstacles). Thresholds for proximity are set. If the proximity thresholds are breached, the platforms can avoid the obstacle, and resume the flight plan.

In some embodiments, on board sensing used to make adjustments for flight control, such as auto swarm control, supervisor software to monitor platform progress, status, sensor inputs and planting progress, or supervisor software to intervene in flight control to ensure platform safety (e.g., stop/start planting; stop/pause/resume flight mission). Adjustments may also be made to the firing mechanism based on temperature, humidity, wind, and other conditions. The firing control system may also be adjusted, for example, by determining which pod to plant either from multiple cartridges with different pods in each, or using a pre-loaded order of different pods in each cartridge. Adjustment of firing parameters based on predetermined pressure calibration and real time data. Triggers the firing mechanism based on all pre-determined and updated parameters.

In some embodiments, confirmation of planting success can be used to determine if the pod was planted or not (e.g., due to misfire), position error from pre-determined planting location, pod mechanical changes upon planting, and/or surface penetration (none/partial/full). As described above, confirmation can be determined using visual indicators (e.g., a dye or powder released from the pod; whether the lid can be visualized above the soil surface; sensors in the pod; etc.

In some embodiments, the inputs to the planting operations can include seed pods, precision planting pattern, power for the platform and firing mechanism, command and data handling, and planting mechanism and firing mechanism status (e.g., number of firings remaining).

At 2714, the platform returns to the pre-determined base station. After the final pod is fired, the platform returns to the base station at a height that is optimized to minimize collision with platforms which are currently planting, and other traversing platforms (e.g., returning to land or coming out to plant). This can be done by having a single or multiple traversing height level and/or each platform can be designated a unique flight level to minimize collision risk. The platforms take into consideration what other platforms are also in the area (e.g., collision avoidance). Platforms can be set to hover at a certain distance and height from base in a queue. When the base station is ready, platforms can then return to the base station as many at a time as is possible for the capability for the base station.

FIG. 28 illustrates a block diagram of a method 2800 of map generation, in accordance with an embodiment of the present invention. As shown in FIG. 28, at 2802 the output maps generated in FIG. 27 can be received. The output maps can include various features (e.g., NVDI, rocks, water, soil, etc.) identified based on the sensor data. Using the output maps, a planting pattern can be generated.

At 2804, generation of the planting pattern can begin by applying various thresholds to the output map data. For example, a threshold for maximum rock placement and density can be applied to areas of the output maps to identify regions with too many, or too closely spaced, rocks for planting. Similarly, thresholds for maximum and minimum water content can be applied to the maps, and regions can be identified based on those thresholds. Additionally, other thresholds, such as proximity to shade, such as trees, rocks, etc. may also be applied. This allows for the output maps to be enriched with additional data based on the features in the maps.

At 2806, additional data, either received through the sensors on the mapping system or through field analysis, historical records, etc. can be received. This data can indicate nutrient content and other growth parameters for the area. In some embodiments, the enriched output maps can be tagged to include the nutrient data and the threshold data. Each output map can be divided into a plurality of units, each representing an area within the output map that has been enriched. For example, each square meter of the output map may be tagged with threshold and nutrient data. The size of the unit may vary depending on the resolution of the output maps and the resolution of the input sensor data.

At 2808, the enriched output maps and the nutrient data can be used to identify planting areas within the map for different species. In some embodiments, planting requirements can be defined for each species being planted in an area. The planting requirements for each species can be compared to each unit of the enriched output maps. Each unit that matches the requirements for a particular species can be identified. At 2810, based on the matching units, a preference map can be generated that identifies which species are to be planted at which locations. The preference map can be generated to increase the chance of growth for the various species in the area and can be based on current species, historical planting success, and other data.

At 2812, a planting pattern is generated over the preference map. The planting pattern can define locations within the preference map for each planting of each species. Each planting can include a species identifier, planting type (e.g., seed, cutting, etc.), pod type, preparation requirements (e.g., aeration, pushing, etc.). The planting pattern can define locations based on the species of plant. For example, different species may tolerate different levels of density, as such a planting pattern for one species may define one planting per square meter in an identified region, whereas a planting pattern for a different species may define one planting per five square meters in a planting region. The planting pattern may then be used as described above with respect to FIG. 26.

At 2814, following planting, the success and failure of each planting can be monitored. In some embodiments, regular mappings can be conducted to inspect the status of each planting and collect sensor data from each planted pod. At 2816, based on the results of the planting, the growth parameters at 2806 and historical data at 2810 can be updated to refine subsequent planting patterns, as discussed further below with respect to FIG. 28.

FIG. 29 illustrates a block diagram of a method 2900 of determining planting patterns, in accordance with an embodiment of the present invention. At 2902, a planting evaluation module can receive the output map data 2802 and planting monitoring data 2814 described above. In some embodiments, the output map data 2702 can be the enriched output map data above. Planting evaluation module 2902 can compare the output map data to the plant monitoring data to identify which geographic and geological features in the output map data are most likely to be associated with successful plantings. Based on this comparison, a probability of survival map 2904 can be generated.

In some embodiments, planting evaluation module can include one or more machine learning classifiers which may be trained using the output map data 2703 and the planting success monitoring data 2814. As described above, the output map data 2703 can include land maps (topology, rock, water, soil, nutrients), surrounding tree species, desired species, etc. and the planting success monitoring data can include planting success on a per tree and/or per species basis. The machine learning classifiers can identify conditions in the output map data 2703 that correlate to particular planting success characteristics. Subsequently, when new areas are mapped, the output maps for those new areas can be processed by the machine learning classifiers to automatically produce a second planting pattern for the new area. This planting may then be monitored and used to further train the machine learning classifiers.

At 2906, precision planting pattern generation module can use the probability of survival map in combination with the planting criteria 2908 of various species of plants to generate a precision planting pattern 2910. Precision planting pattern generation module 2906 can evaluate the probability of survival map 2904 and the planting criteria 2908 similar to step 2208 described above. Precision planting pattern 2910 can then be used at 2710 in FIG. 27 to be divided among available mobile transport platforms for a planting operation.

In some embodiments, precision planting pattern 2910 can include GPS coordinates for each planting in a planting area. In some embodiments the planting pattern may further include visual imagery from local areas to aid in identifying the planting locations. Planting pattern 2910 can further define a species for each planting and planting conditions, such as time of year, weather forecast, soil conditions, temperature, etc.

Figure 30:
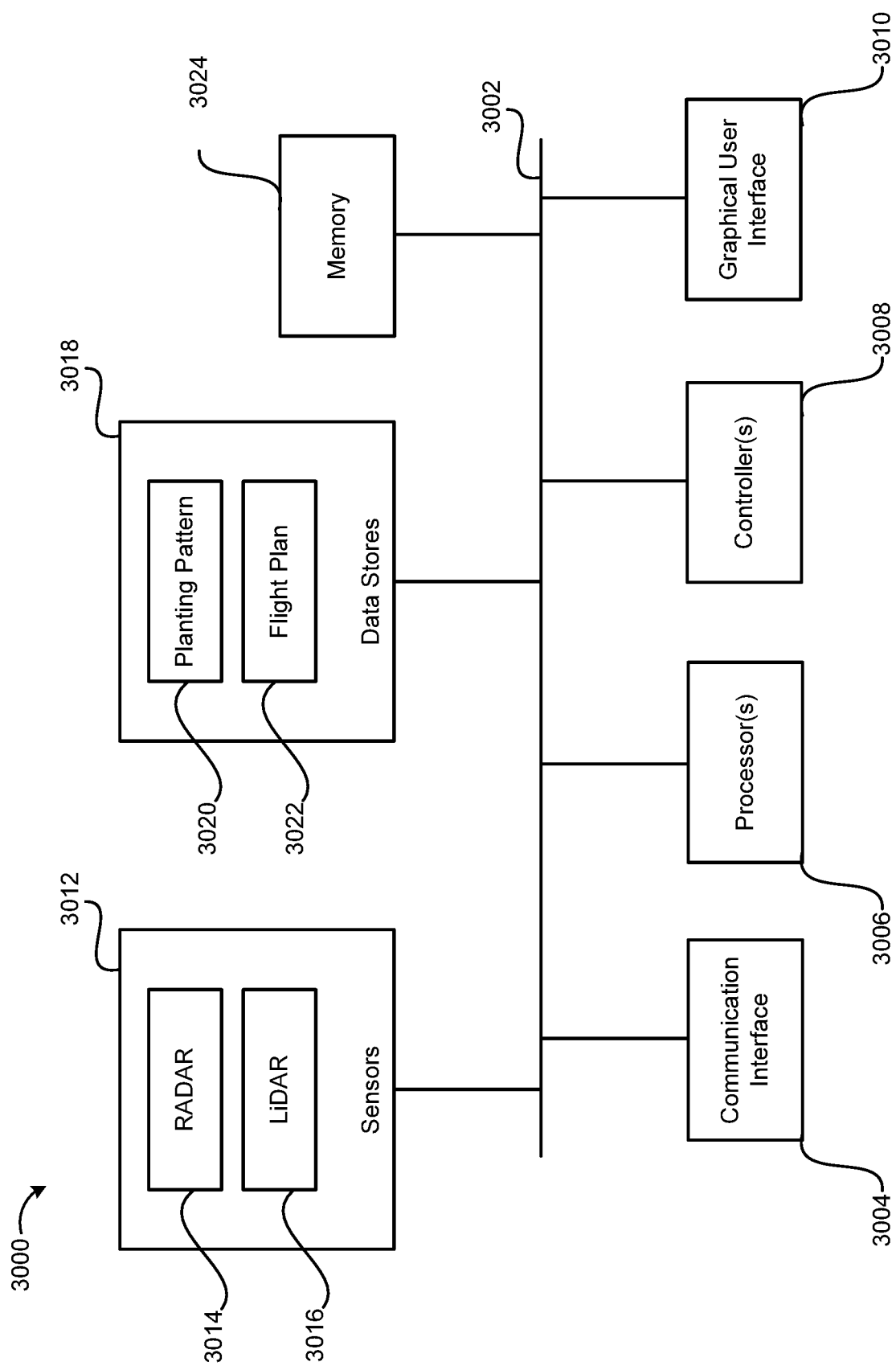
FIG. 30 illustrates a high level block diagram of a computer system, in accordance with an embodiment of the present invention.

FIG. 30 illustrates a high level block diagram 3000 of a computer system, in accordance with an embodiment of the present invention. As shown in FIG. 30, a computer system can include hardware elements connected via a bus 3002, including a network interface 3004, that enables the computer system to connect to other computer systems over a local area network (LAN), wide area network (WAN), mobile network (e.g., EDGE, 3G, 4G, or other mobile network), or other network. Communication interface 3004 can further include a wired or wireless interface for connecting to infrared, Bluetooth, or other wireless devices, such as other platforms or pods. The computer system can further include one or more processors 3006, such as a central processing unit (CPU), field programmable gate array (FPGA), application-specific integrated circuit (ASIC), network processor, or other processor. Processors may include single or multi-core processors.

In some embodiments, one or more controllers 3008 can be used to control the navigation of the mobile transport platform, the controllers may include hardware and software controllers designed to control the various mobile transport platforms described herein. In some embodiments, the computer system can include a graphical user interface (GUI) 3010. GUI 3010 can connect to a display (LED, LCD, tablet, touch screen, or other display) to output user viewable data. In some embodiments, GUI 3010 can be configured to receive instructions (e.g., through a touch screen or other interactive interface).

In some embodiments, one or more sensors 3012 can be used to navigate and to gather data describing the surrounding area that can be used to create a map of local land characteristics. In some embodiments, sensors 3012 can include various electromagnetic sensors such as visual, multispectral, hyperspectral, radar 3014, LiDAR 3016, and infrared sensors. In some embodiments, sensors 3012 can include various communication modules such as GPS or other positioning modules and mobile network communication modules.

In some embodiments, the computer system may include local or remote data stores 3018. Data stores 3018 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 3018 can include data generated, stored, or otherwise utilized as described herein. For example, data stores 3018 can include all or portions of planting patterns 3020 and flight plans 3022, generated and stored as described above. Memory 3024 can include various memory technologies, including RAM, ROM, EEPROM, flash memory or other memory technology. Memory 3024 can include executable code to implement methods as described herein.

In some embodiments, the delivery platform and pods can be used for other purposes. For example, a pod that includes particular dyes can be fired into specified locations within water systems to track algal blooms. Other plants (such as agricultural crops, moss, and flowers) may also be planted using a similar systems. For example, flowers may be planted for decorative uses with detailed patterns, on difficult to reach locations, e.g. on round-a-bouts, in fields, for patterns to be seen from the air or space. Dyes for indication of unexploded ordinance In some embodiments, a UAV may be used for aerial targeted nutrient delivery. For example, the UAV can spray mists or gels, at leaves of particular plants, or may deliver a splat ball aimed at base or leaves of a plant. Similarly, an exploding splat ball or grenade can be delivered to an area by aiming at a canopy, the splat ball can be configured to explode just before reaching tree, covering leaves in gelatinous nutrient. A sploosh ball can be delivered by aiming a highly gelatinous, pulsed high velocity, ball at the base of plants.

In some embodiments, a method for detection, counting, estimation, and determination of readiness to collect conifer cones and seeds (non-conifers as well). A UAV as described above can monitor cones (or other seeds), measure a current state (e.g., green or not), determine counts per tree, and estimate those not counted (e.g., hidden from view), estimate total seed yields, and determine when ready to harvest (e.g., based on a shift in spectral signature from green to brown, and "openness", indicating if they are ready).

In some embodiments, pods can be used for soil restoration. The pods can be fired to bind unstable soil or rock on difficult terrain. The pods can include location, climate, terrain, etc. specific nutrients, bacteria/fungi, and/or worms or worm eggs.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for planting pods from a planting platform, comprising:
   receiving, by one or more planting platforms, respective portions of a planting pattern, wherein the planting pattern is generated using at least one or more maps and defines geographical locations to plant pods, and wherein each respective portion is divided from the planting pattern based on a quantity of the one or more planting platforms, and the planting pattern is generated by comparing an enriched map to a planting requirement for a payload of a pod, wherein an enriched map includes terrain data and one or more terrain thresholds;

identifying, based on the comparison, one or more planting regions for the payload; and defining the planting pattern for the payload based on a density level associated with the payload; and executing, by one or more planting platforms, the planting operation, wherein the planting operation includes firing the pods at the geographical locations based on at least the planting pattern, wherein the executing of the planting operation for this planting platform includes, comparing, by this planting platform, a satellite navigation position of this planting platform with a location in the planting pattern; and executing, by this planting platform, a planting operation when the satellite navigation position of this planting platform is within a threshold of the location in the planting pattern.

2. The computer-implemented method of claim 1, wherein the one or more planting platforms include one or more unmanned aerial vehicles (UAVs).

3. The computer-implemented method of claim 1, wherein the one or more maps include the terrain data identifying one or more of structures, terrain types, or debris, and wherein generating the planting pattern for the planting operation using the one or more maps includes identifying areas for planting based on the terrain data.

4. The computer-implemented method of claim 3, further comprising generating the planting pattern for the planting operation using the one or more maps further comprises:

applying the one or more terrain thresholds to a tag in the one or more maps; and tagging one or more regions of the one or more maps with threshold data to generate the one or more enriched maps.

5. The computer-implemented method of claim 4, wherein the payload includes one or more of:

planting material for at least one species of plant;
at least one organism;
support matrix material; or
a sensor.

6. The computer-implemented method of claim 5 further comprising:

defining the planting pattern for the payload based on a distribution of plant species in an area represented by the maps.

7. The computer-implemented method of claim 5 further comprising:

defining the planting pattern for the payload based on at least soil restoration requirements.

8. The computer-implemented method of claim 5 further comprising:

defining the planting pattern for the payload based on one or more decorative patterns.

9. The computer-implemented method of claim 1, wherein each location of the geographical locations is further associated with one or more of:

at least one organism;
support matrix material;
or a sensor.

10. A planting platform, comprising:

at least one processor; and memory including instructions that, when executed by the at least one processor, cause the planting platform to:

receive, by one or more planting platforms, respective portions of a planting pattern, wherein the planting pattern is generated using at least one or more maps and defines geographical locations to plant pods, and wherein each respective portion is divided from the planting pattern based on a quantity of the one or more planting platforms, and the planting pattern is generated by comparing an enriched map to planting requirements for a payload of a pod, wherein an enriched map includes terrain data and terrain threshold;

identifying, based on the comparison, one or more planting regions for the payload; and defining the planting pattern for the payload based on a density level associated with the payload; and execute the planting operation, wherein the planting operation includes firing the pods at the geographical locations based on at least the planting pattern, wherein the executing of the planting operation further causes the planting platform to, compare a satellite navigation position of this planting platform with a location in the planting pattern; and execute a planting operation when the satellite navigation position of this planting platform is within a threshold of the location in the planting pattern.

11. The planting platform of claim 10, wherein the planting platforms is an unmanned aerial vehicles (UAVs).

12. The planting platform of claim 10, wherein the one or more maps include terrain data identifying one or more of structures, terrain types, or debris, and wherein generating the planting pattern for the planting operation using the one or more maps includes identifying areas for planting based on the terrain data.

13. The planting platform of claim 12, wherein the instructions, when executed, further cause the computing system to:

apply one or more terrain thresholds to a tag in the one or more maps; and tag one or more regions of the one or more maps with threshold data to generate one or more enriched maps.

14. The planting platform of claim 13, wherein the instructions, when executed, further cause the computing system to:

compare the enriched maps to planting requirements for a payload;

identifying, based on the comparison, one or more planting regions for the payload; and defining the planting pattern for the payload based on a density level associated with the payload.

15. The planting platform of claim 14, wherein the payload includes one or more of one or more of:

planting material for the at least one species of plant;
at least one organism;
support matrix material; or
a sensor.

16. The planting platform of claim 15, wherein the instructions, when executed, further cause the computing system to:

define the planting pattern for the payload based on a distribution of plant species in an area represented by the maps.

17. A non-transitory computer-readable storage medium including instructions that, when executed by at least one processor of a computing device, cause the computing device to:

receive, by one or more planting platforms, respective portions of a planting pattern, wherein the planting pattern is generated using at least one or more maps and defines geographical locations to plant pods, and wherein each respective portion is divided from the planting pattern based on a quantity of the one or more planting platforms, and the planting pattern is generated by comparing an enriched map to planting requirements for a payload of a pod, wherein an enriched map includes terrain data and terrain threshold;

identifying, based on the comparison, one or more planting regions for the payload; and defining the planting pattern for the payload based on a density level associated with the payload; and execute, by one or more planting platforms, the planting operation, wherein the planting operation includes firing the pods at the geographical locations based on at least the planting pattern, wherein the executing of the planting operation for this planting platform further causes the computing device to, compare, by this planting platform, a satellite navigation position of this planting platform with a location in the planting pattern; and execute, by this planting platform, a planting operation when the satellite navigation position of this planting platform is within a threshold of the location in the planting pattern.

18. The non-transitory computer-readable storage medium of claim 17, wherein the one or more planting platforms include one or more unmanned aerial vehicles (UAVs).

19. The non-transitory computer-readable storage medium of claim 17, wherein the one or more maps include terrain data identifying one or more of structures, terrain types, or debris, and wherein generating the planting pattern for a planting operation using the one or more maps includes identifying areas for planting based on the terrain data.

* * * * *